US011076376B2

United States Patent
Youn et al.

(10) Patent No.: US 11,076,376 B2
(45) Date of Patent: *Jul. 27, 2021

(54) DE-REGISTRATION METHOD IN WIRELESS COMMUNICATION SYSTEM AND APPARATUS THEREFOR

(71) Applicant: LG ELECTRONICS INC., Seoul (KR)

(72) Inventors: Myungjune Youn, Seoul (KR); Laeyoung Kim, Seoul (KR); Jinsook Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/915,451

(22) Filed: Jun. 29, 2020

(65) Prior Publication Data

US 2020/0329450 A1  Oct. 15, 2020

Related U.S. Application Data

(63) Continuation of application No. 16/065,126, filed as application No. PCT/KR2017/013352 on Nov. 22, 2017, now Pat. No. 10,736,072.

(Continued)

(51) Int. Cl.
*H04W 60/06* (2009.01)
*H04W 76/30* (2018.01)
(Continued)

(52) U.S. Cl.
CPC .............. *H04W 60/06* (2013.01); *H04W 8/20* (2013.01); *H04W 68/005* (2013.01);
(Continued)

(58) Field of Classification Search
CPC ....... H04W 60/06; H04W 76/30; H04W 8/20; H04W 68/005; H04W 76/32; H04W 8/18; H04W 36/14
See application file for complete search history.

(56) References Cited

U.S. PATENT DOCUMENTS

2010/0135255 A1  6/2010  Zhang et al.
2010/0227621 A1* 9/2010  Wu ........................ H04L 47/824
                                                    455/450
(Continued)

FOREIGN PATENT DOCUMENTS

CN       104919829     9/2015
KR      1020100015711  2/2010
(Continued)

OTHER PUBLICATIONS

3GPP TS 23.502 V0.5.0 (Jul. 2017) 3rd Generation Partnership Project; Technical Specification Group Services and System Aspects; Procedures for the 5G System; Stage 2 (Year: 2017).*

(Continued)

*Primary Examiner* — Dinh Nguyen
(74) *Attorney, Agent, or Firm* — Lee Hong Degerman Kang Waimey

(57) ABSTRACT

Disclosed herein is a network-initiated deregistration method by an access and mobility management function (AMF) in a wireless communication system, including: receiving a first message having a removal reason configured to subscription withdrawn from a unified data management (UDM); and transmitting a deregistration request message for requesting the deregistration to a user equipment (UE), in which the deregistration is enabled to be performed for all accesses in which the UE is registered when the removal cause received from the UDM through the first message indicates the subscription withdrawn of the UE.

16 Claims, 17 Drawing Sheets

Related U.S. Application Data

(60) Provisional application No. 62/545,488, filed on Aug. 15, 2017, provisional application No. 62/475,885, filed on Mar. 24, 2017, provisional application No. 62/441,960, filed on Jan. 3, 2017, provisional application No. 62/439,168, filed on Dec. 27, 2016, provisional application No. 62/426,579, filed on Nov. 27, 2016.

(51) Int. Cl.
| | |
|---|---|
| *H04W 8/20* | (2009.01) |
| *H04W 68/00* | (2009.01) |
| *H04W 8/18* | (2009.01) |
| *H04W 36/14* | (2009.01) |
| *H04W 76/32* | (2018.01) |

(52) U.S. Cl.
CPC .............. *H04W 76/30* (2018.02); *H04W 8/18* (2013.01); *H04W 36/14* (2013.01); *H04W 76/32* (2018.02)

(56) References Cited

U.S. PATENT DOCUMENTS

| | | |
|---|---|---|
| 2011/0044307 A1 | 2/2011 | Mohanty et al. |
| 2011/0117914 A1 | 5/2011 | Yang et al. |
| 2011/0119357 A1 | 5/2011 | Lindholm et al. |
| 2013/0028172 A1* | 1/2013 | Lim ..................... H04W 36/12 370/315 |
| 2013/0044709 A1 | 2/2013 | Adjakpie et al. |
| 2013/0217389 A1 | 8/2013 | Punz et al. |
| 2014/0287765 A1 | 9/2014 | Lu et al. |
| 2014/0355458 A1 | 12/2014 | Kapoor et al. |
| 2015/0339131 A1 | 11/2015 | Wu |
| 2016/0345230 A1 | 11/2016 | Cuevas Ramirez et al. |
| 2017/0070892 A1 | 3/2017 | Song et al. |
| 2017/0332226 A1 | 11/2017 | Bharatia |
| 2018/0198867 A1* | 7/2018 | Dao .................. H04W 36/0016 |
| 2018/0227743 A1 | 8/2018 | Faccin et al. |
| 2018/0270888 A1 | 9/2018 | Faccin |
| 2018/0279397 A1 | 9/2018 | Faccin et al. |
| 2018/0288582 A1 | 10/2018 | Buckley et al. |
| 2018/0332523 A1 | 11/2018 | Faccin et al. |
| 2018/0376446 A1 | 12/2018 | Youn et al. |
| 2019/0261260 A1 | 8/2019 | Dao et al. |

FOREIGN PATENT DOCUMENTS

| | | |
|---|---|---|
| KR | 1020110104915 | 9/2011 |
| KR | 20130020891 | 3/2013 |
| KR | 1020140055857 | 5/2014 |
| KR | 20160084516 | 7/2016 |
| WO | 2015115814 | 8/2015 |
| WO | 2016140469 | 9/2016 |

OTHER PUBLICATIONS

PCT International Application No. PCT/KR2017/013352, International Search Report dated Mar. 15, 2018, 9 pages.
3rd Generation Partnership Project (3GPP), Technical Specification Group Services and System Aspects; Study on Architecture for Next Generation System (Release 14); 3GPP TR 23.799 V1.1.0, Oct. 2016, 503 pages.
United States Patent and Trademark Office U.S. Appl. No. 16/065,075, Office Action dated Dec. 31, 2018, 27 pages.
PCT International Application No. PCT/KR2017/013355, International Search Report dated Mar. 15, 2018, 3 pages.
European Patent Office Application U.S. Appl. No. 17874596A, Search Report dated Apr. 9, 2020, 11 pages.
Japan Patent Office Application No. 2019-501454, Office Action dated Apr. 7, 2020, 2 pages.
3rd Generation Partnership; Technical Specification Group Services and System Aspects; GPRS enhancements for E-UTRAN access (Release 8), 3GPP TS 23.401 V1.3.0, Oct. 2007, 136 pages.
3rd Generation Partnership Project; Technical Specification Group Services and System Aspects; General Packet Radio Service (GPRS); Service description; Stage 2 (Release 14), 3GPP TS 23.060 V14.1.0, Sep. 2016, 366 pages.
United States Patent and Trademark Office U.S. Appl. No. 16/065,126, Office Action dated Dec. 10, 2018, 18 pages.
United States Patent and Trademark Office U.S. Appl. No. 16/065,126, Final Office Action dated Apr. 11, 2019, 30 pages.
United States Patent and Trademark Office U.S. Appl. No. 16/065,126, Office Action dated Dec. 12, 2019, 24 pages.
Japan Patent Office Application No. 2019-508200, Office Action dated Nov. 19, 2019, 2 pages.
ETRI, "TS 23.502: De-registration Procedures", S2-171090, SA WG2 Meeting #119, Feb. 2017, 4 pages.
Huawei et al., "Pseudo CR on TS 23.502 for updating registration procedures with NF service operation invocations", S2-174161, SA WG2 Meeting #122, Jun. 2017,16 pages.
Nokia et al., "23.501 §5.3.2: Consistency between common and N3GPP RM states", S2-174309, SA WG2 Meeting #122, Jun. 2017, 6 pages.
Samsung, "TS 23.502: Registration and Session management procedure when registered for both access types", S2-172855, SA WG2 Meeting #120, Mar. 2017, 4 pages.
LG Electronics et al., "PDU session release procedure", S2-170239, SA WG2 Meeting #118-BIS. Jan. 2017, 3 pages.
European Patent Office Application Serial No. 17872950.5, Search Report dated Mar. 26, 2020, 7 pages.
3rd Generation Partnership Project; Technical Specification Group Services and System Aspect; Procedures for the 5G System; Stage 2 (Release 15), 3GPP TS 23.502 V1.3.0, Nov. 2017, 215 pages.
3rd Generation Partnership Project; Technical Specification Group Core Network and Terminals; 5G System—Phase 1; CT WG4 Aspects (Release 15), 3GPP TR 29.891 V0.2.0, Apr. 2017, 50 pages.
3rd Generation Partnership Project; Technical Specification Group Services and System Aspect; System Architecture or the 5G System; Stage 2 (Release 15), 3GPP TS 23.501 V1.0.0, Jun. 2017, 146 pages.
Korean Intellectual Property Office Application No. 10-2019-7002997, Office Action dated Jan. 31, 2020, 4 pages.
Huawei et al., "Clarification on the Service based interface", S2-167059, SA WG2 Meeting #118, Nov. 2016, 11 pages.
The State Intellectual Property Office of the People's Republic of China Application Serial No. 201780012923.0, Office Action dated Oct. 30, 2020, 7 pages.
The State Intellectual Property Office of the People's Republic of China Application Serial No. 201780012922.6, Office Action dated Dec. 9, 2020, 5 pages.

\* cited by examiner

[FIG. 1]
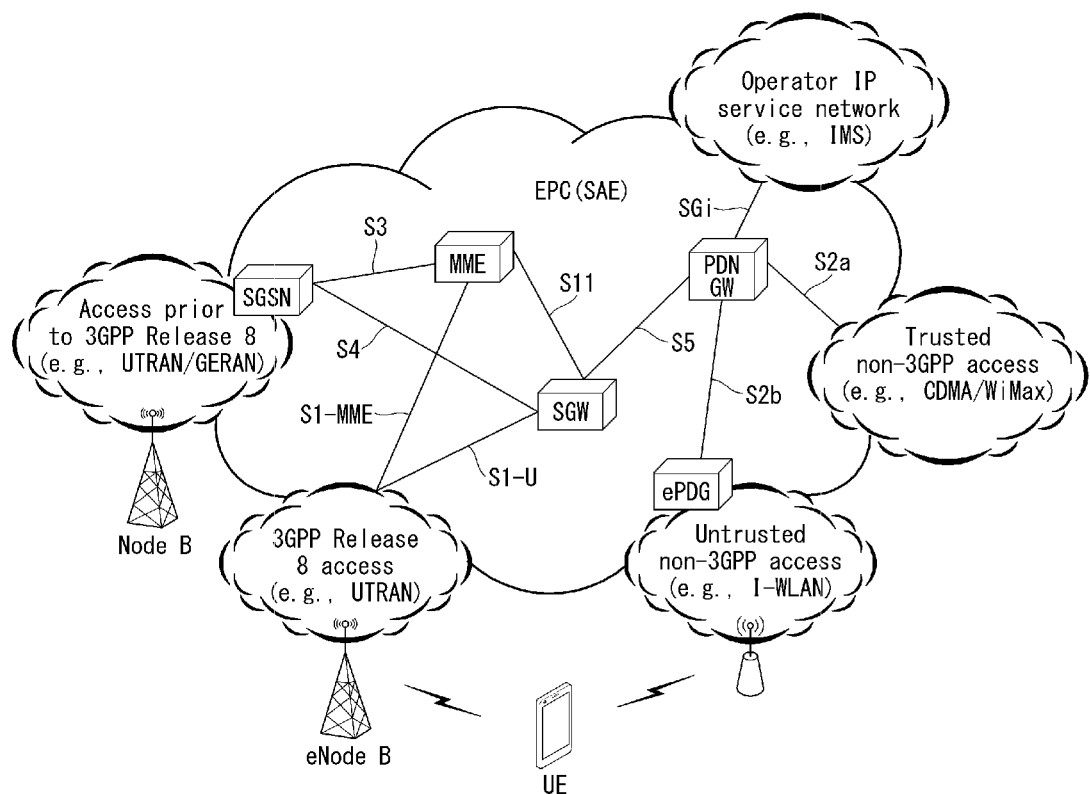

[FIG. 2]
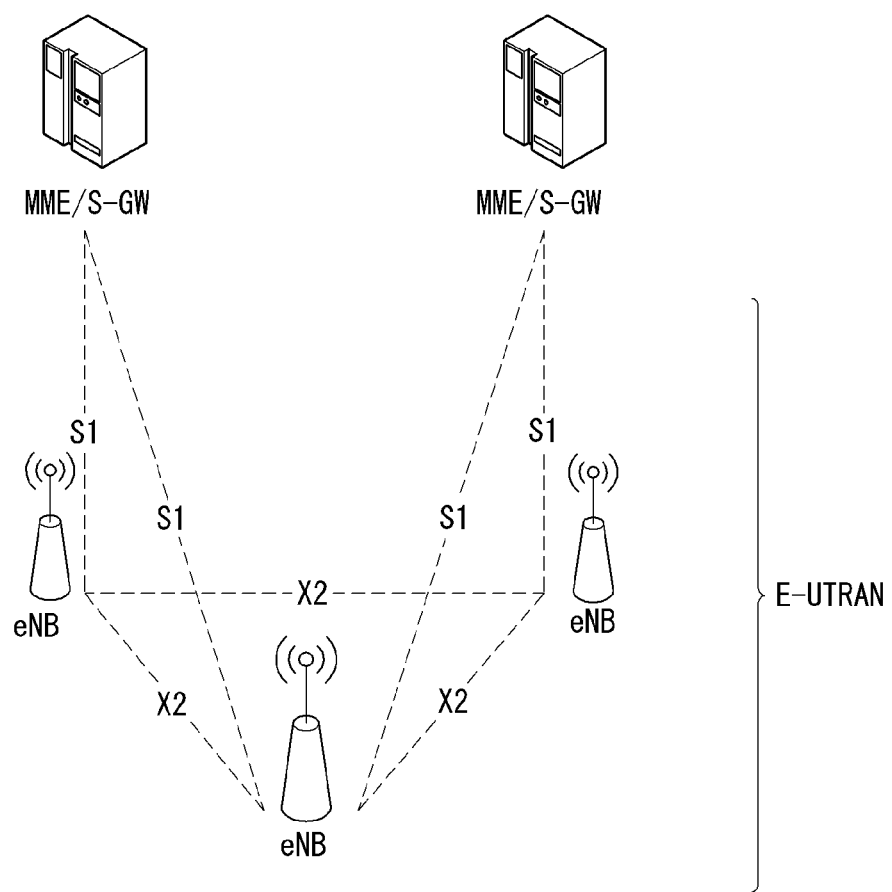

[FIG. 3]
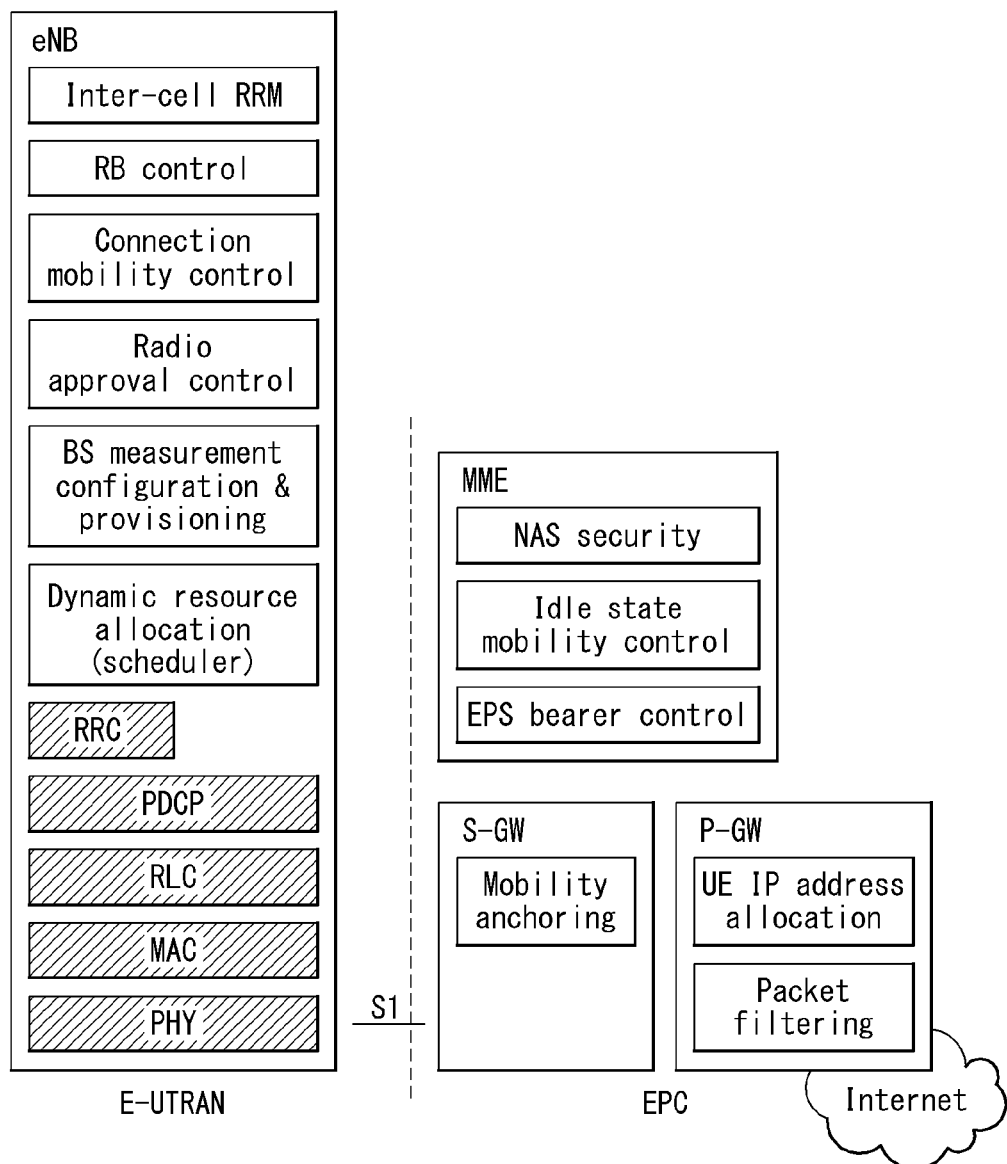

[FIG. 4]
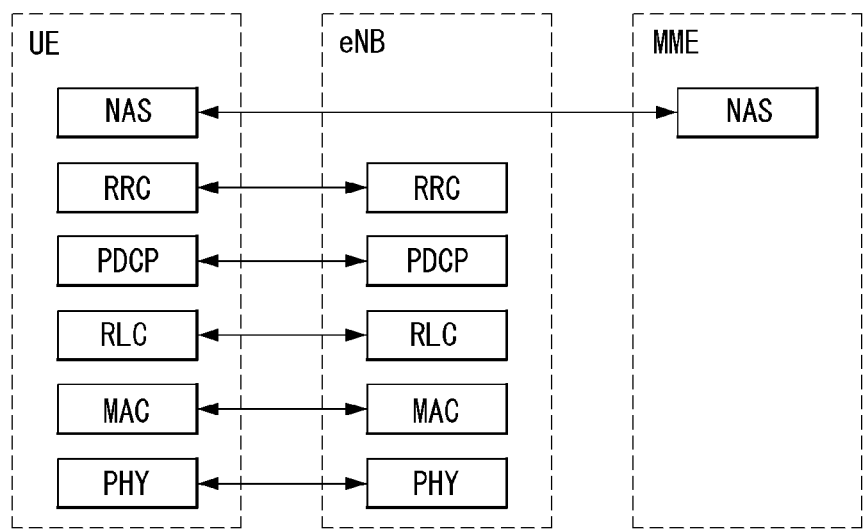
(a) Control plane protocol stack
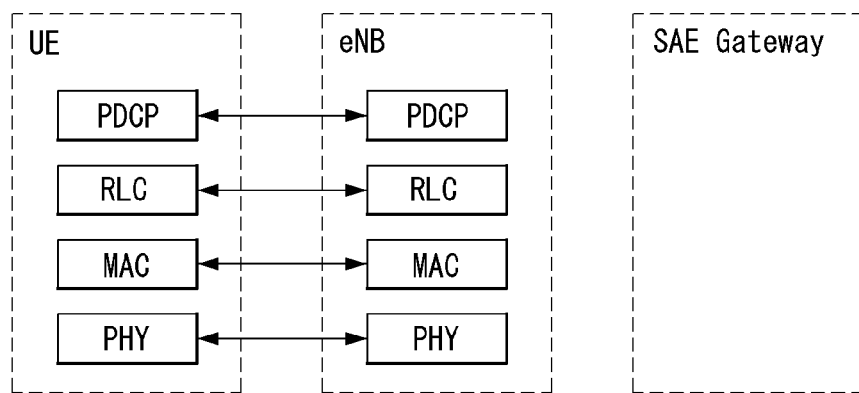
(b) User plane protocol stack 【FIG. 5】
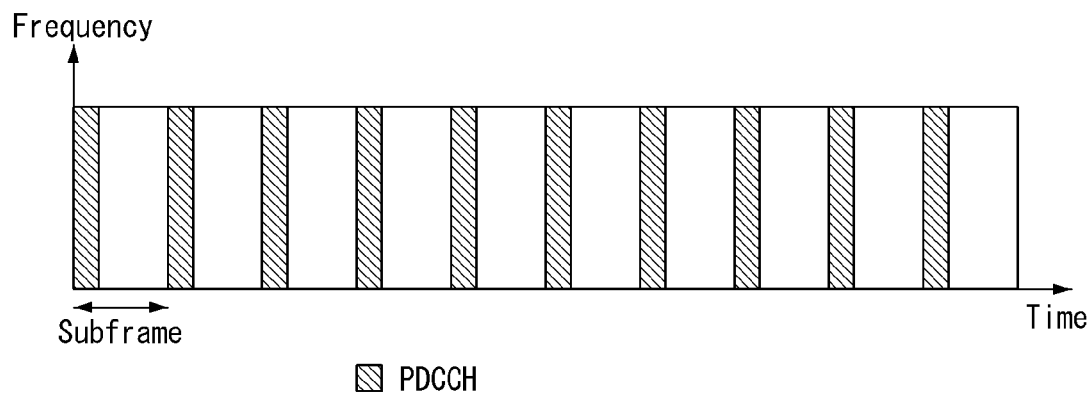
【FIG. 6】
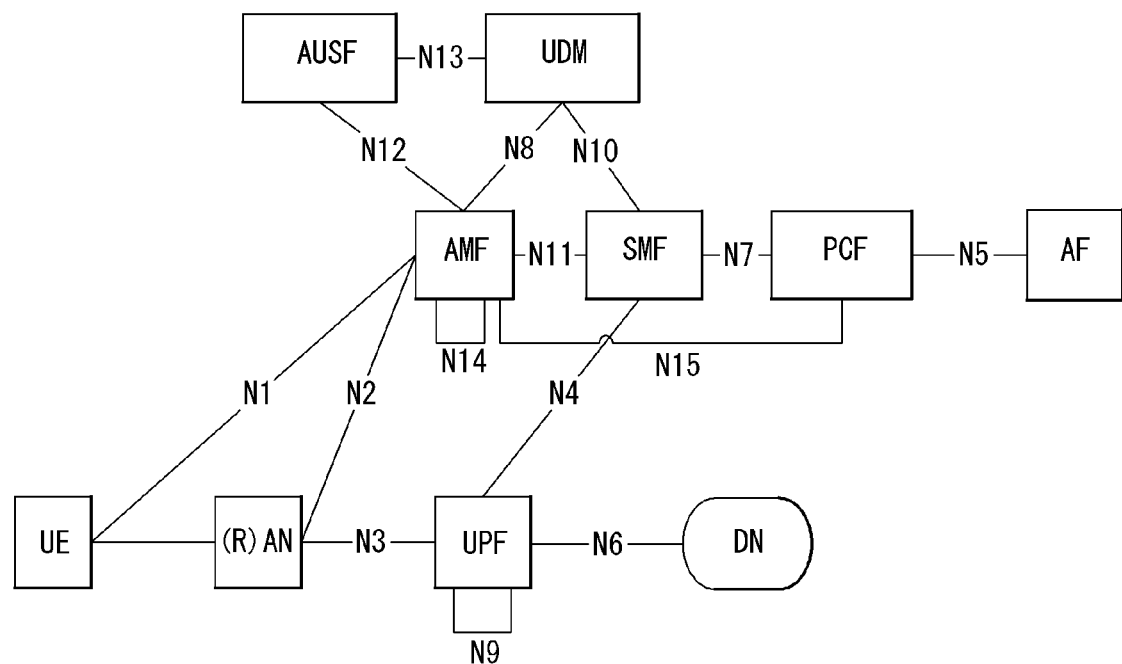

[FIG. 7]
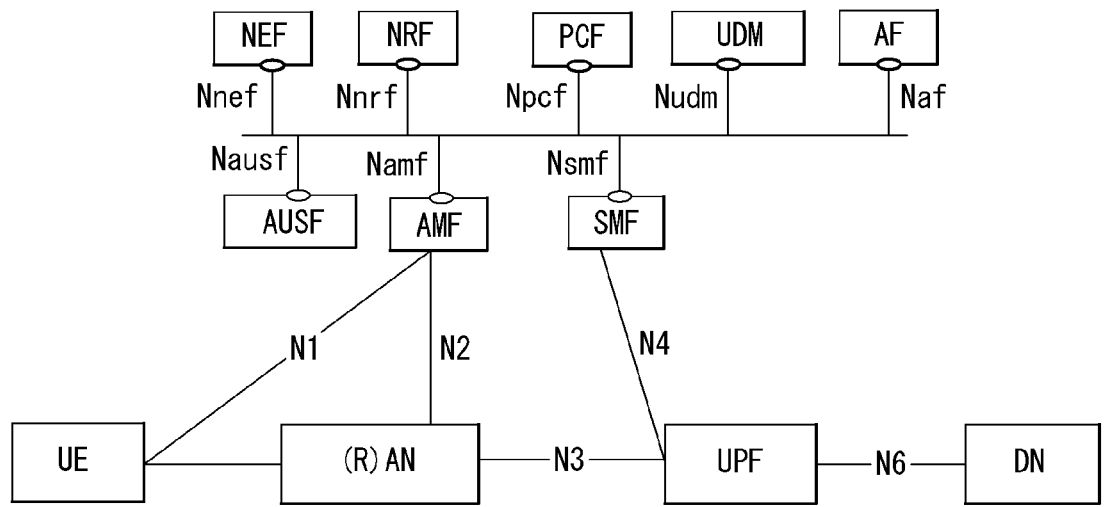

【FIG. 8】
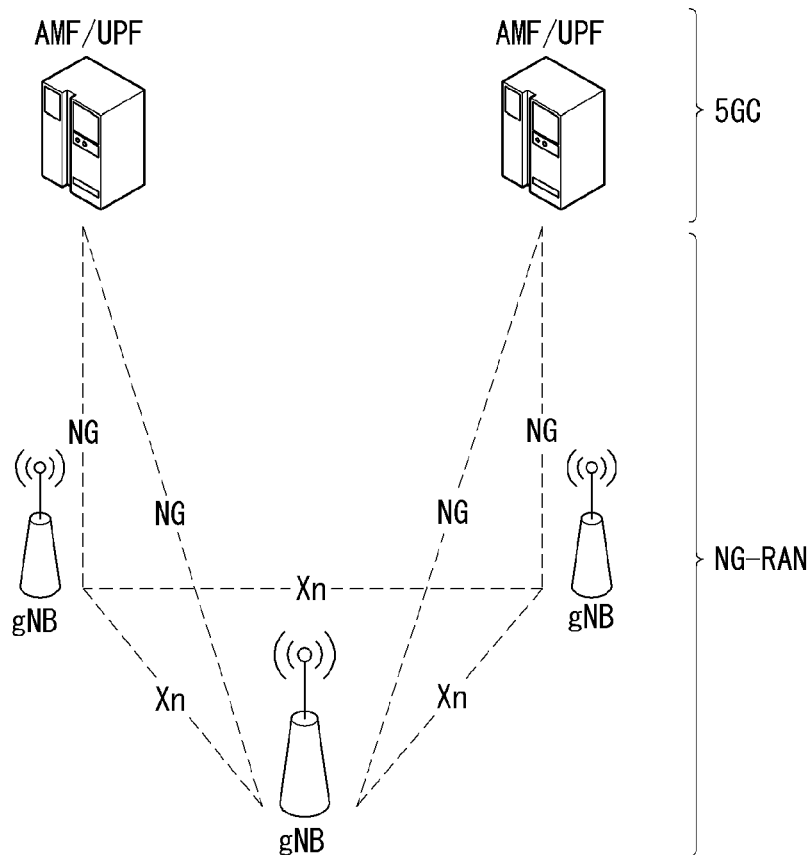
【FIG. 9】
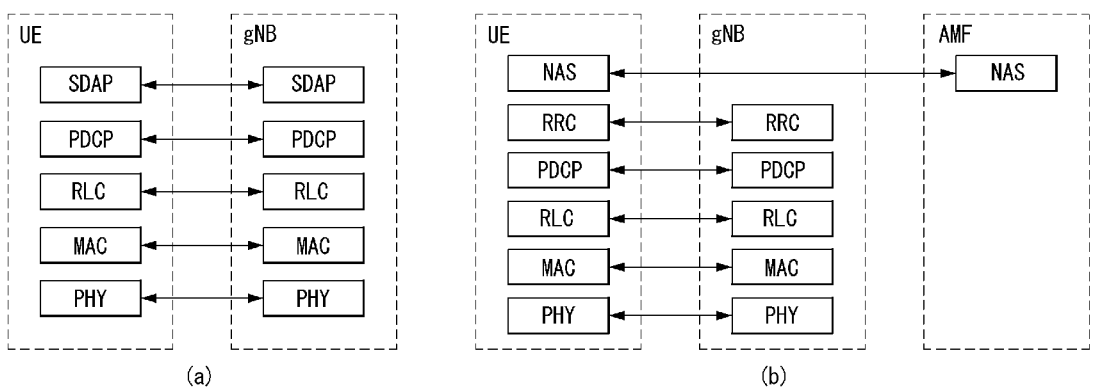

[FIG. 10]
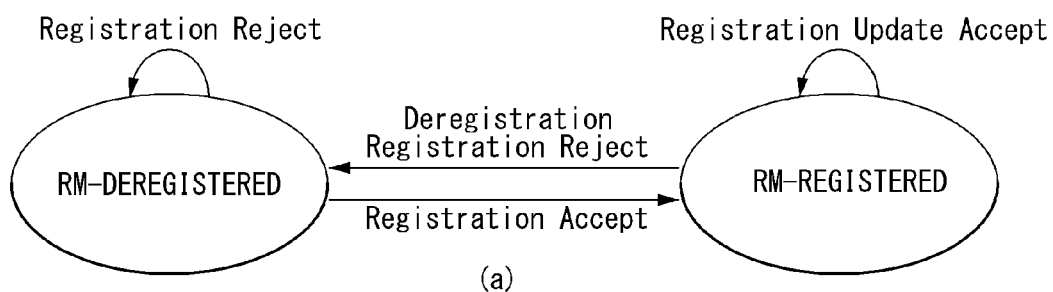
(a)
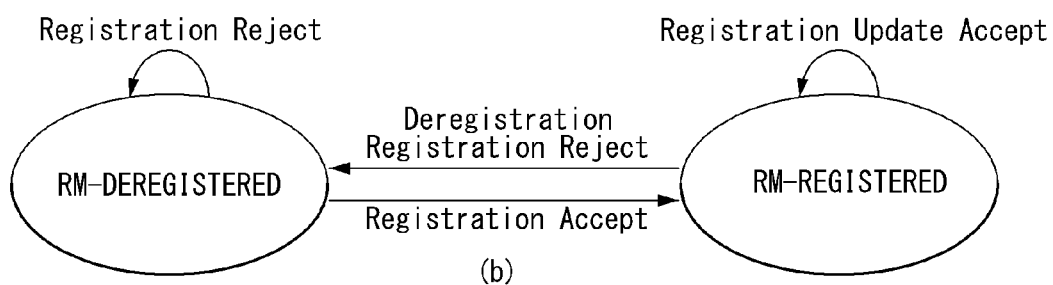
(b)

[FIG. 11]
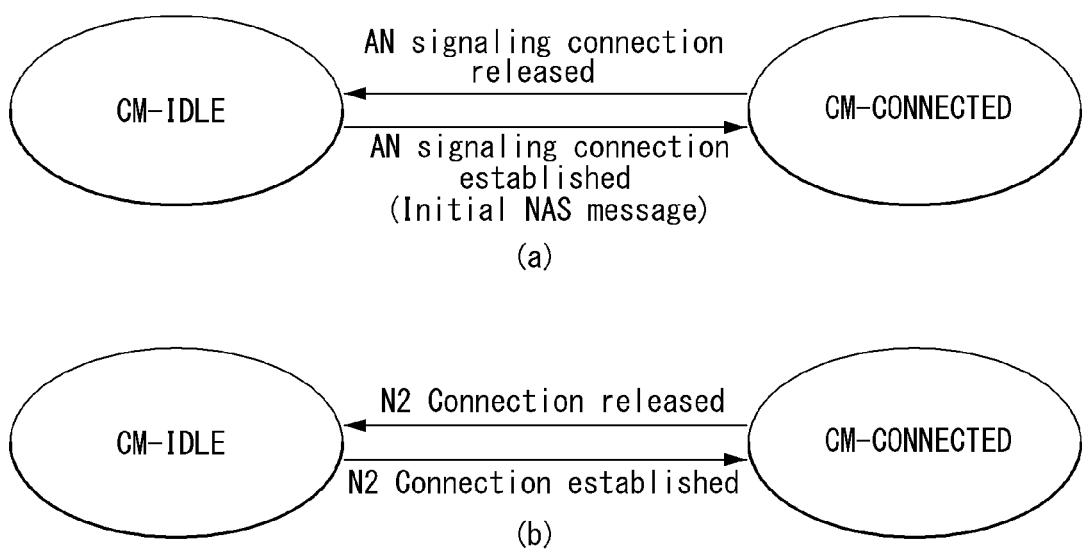

【FIG. 12】
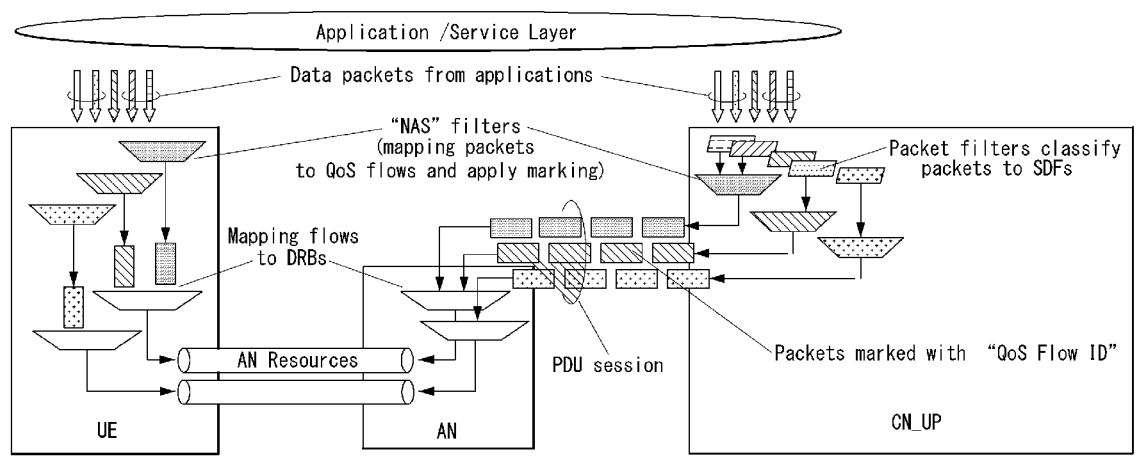
【FIG. 13】
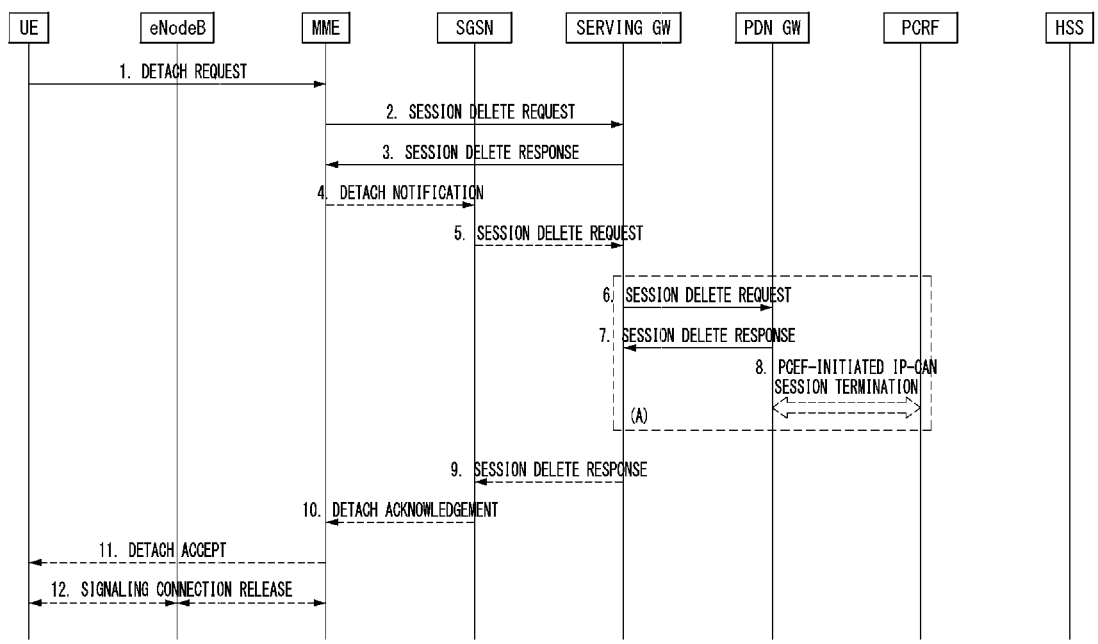

[FIG. 14]
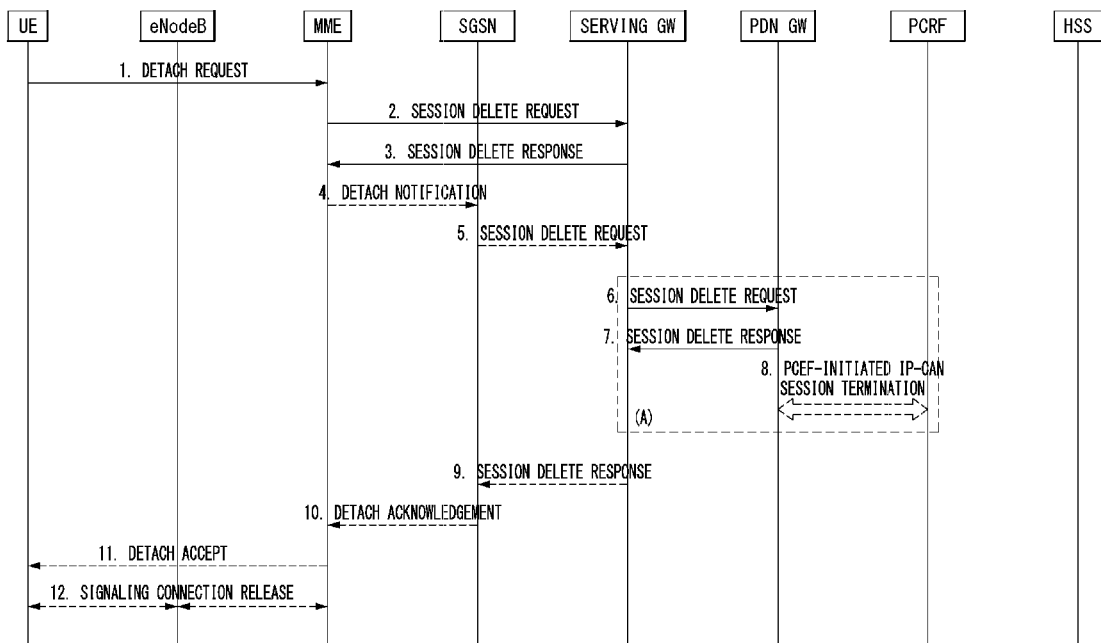
[FIG. 15]
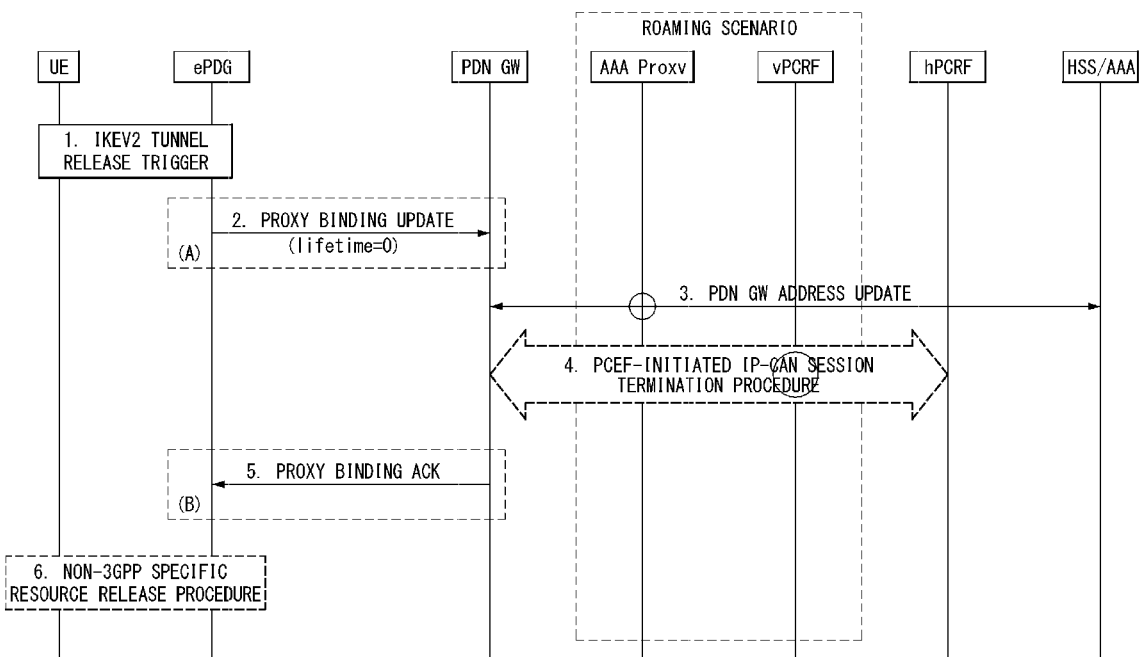

[FIG. 16]
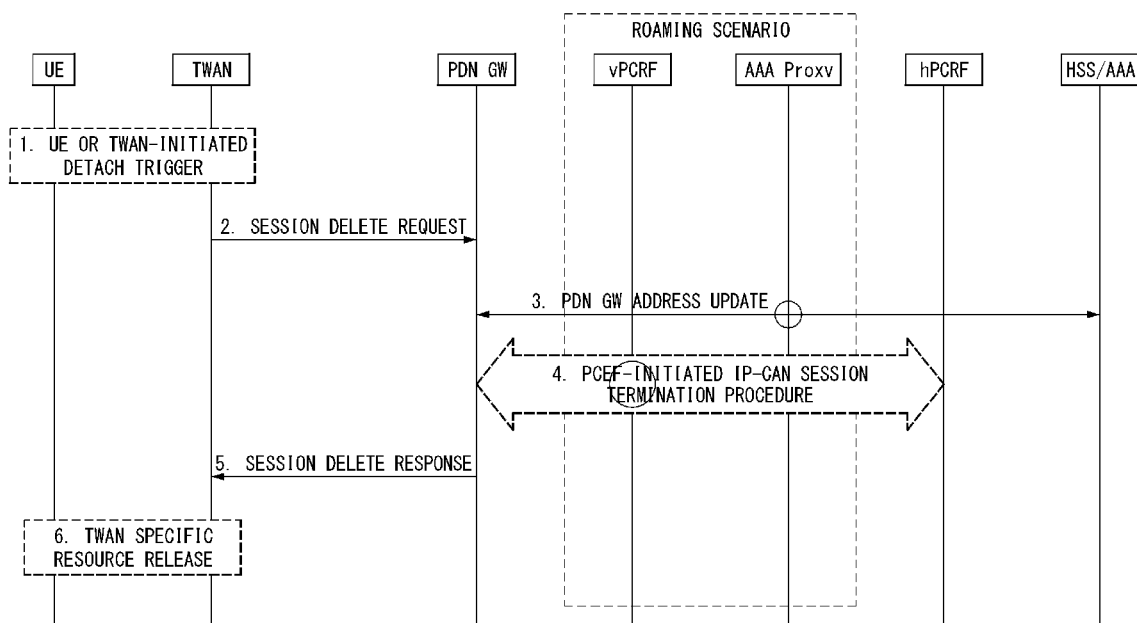

[FIG. 17]
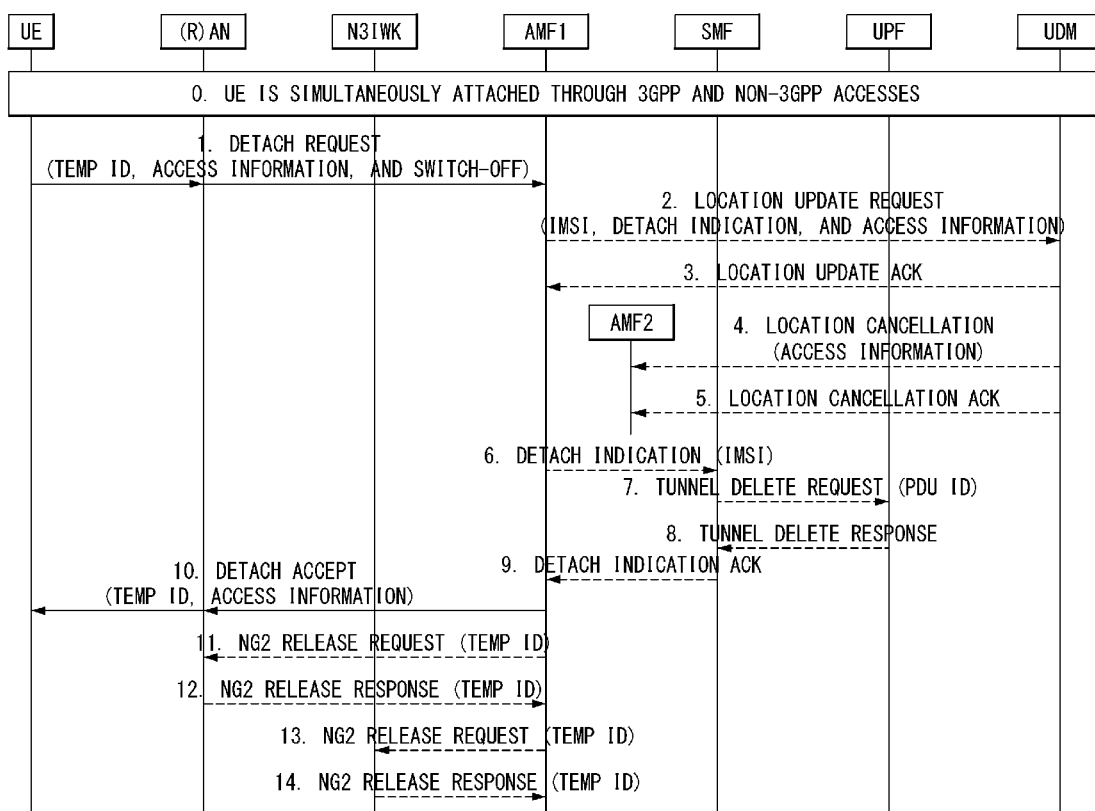

[FIG. 18]
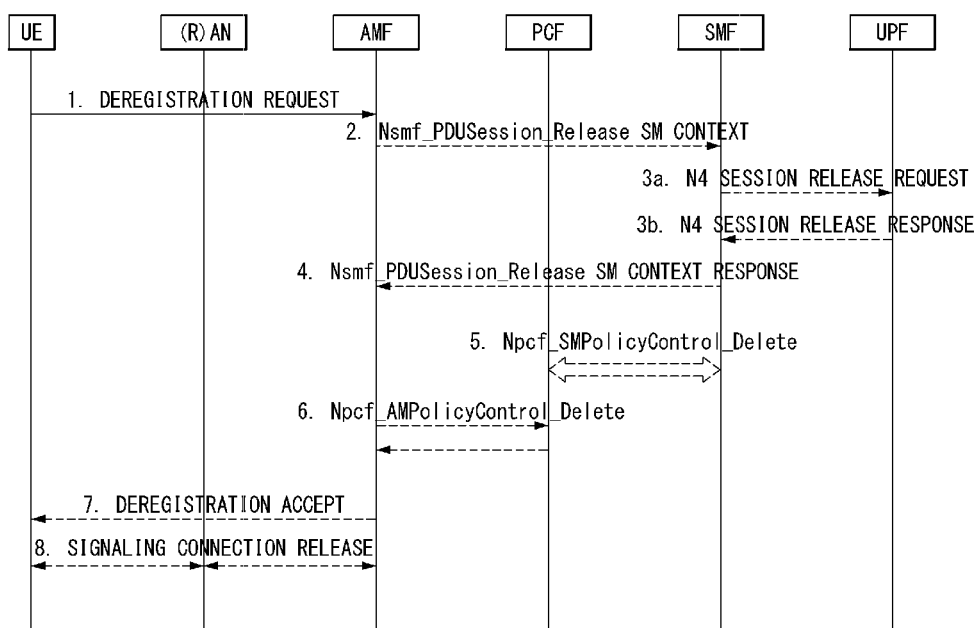

[FIG. 19]
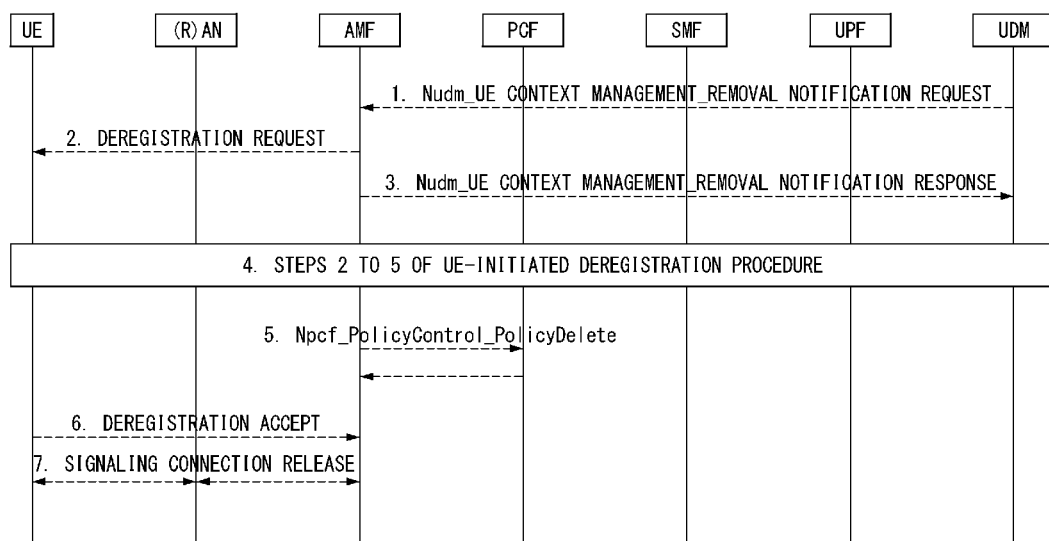
[FIG. 20]
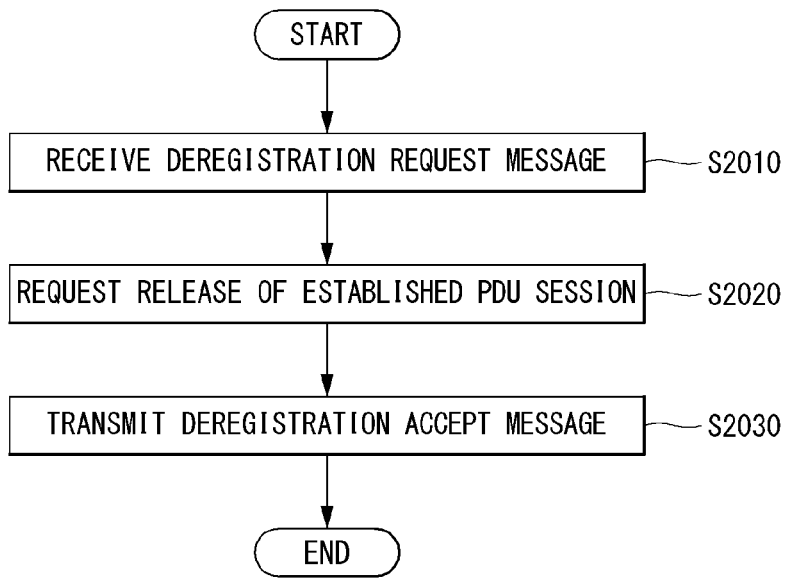

[FIG. 21]
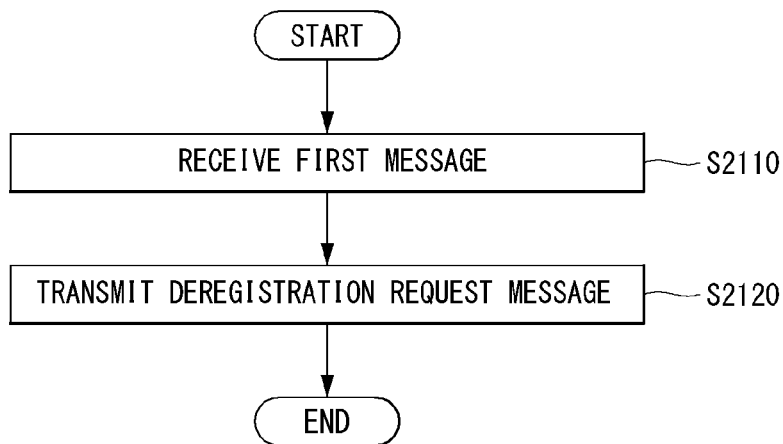
[FIG. 22]
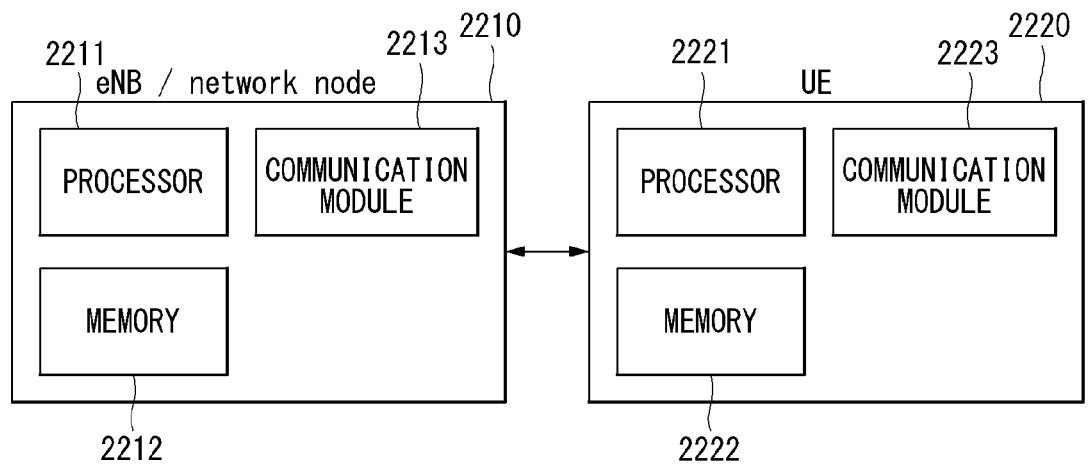

[FIG. 23]
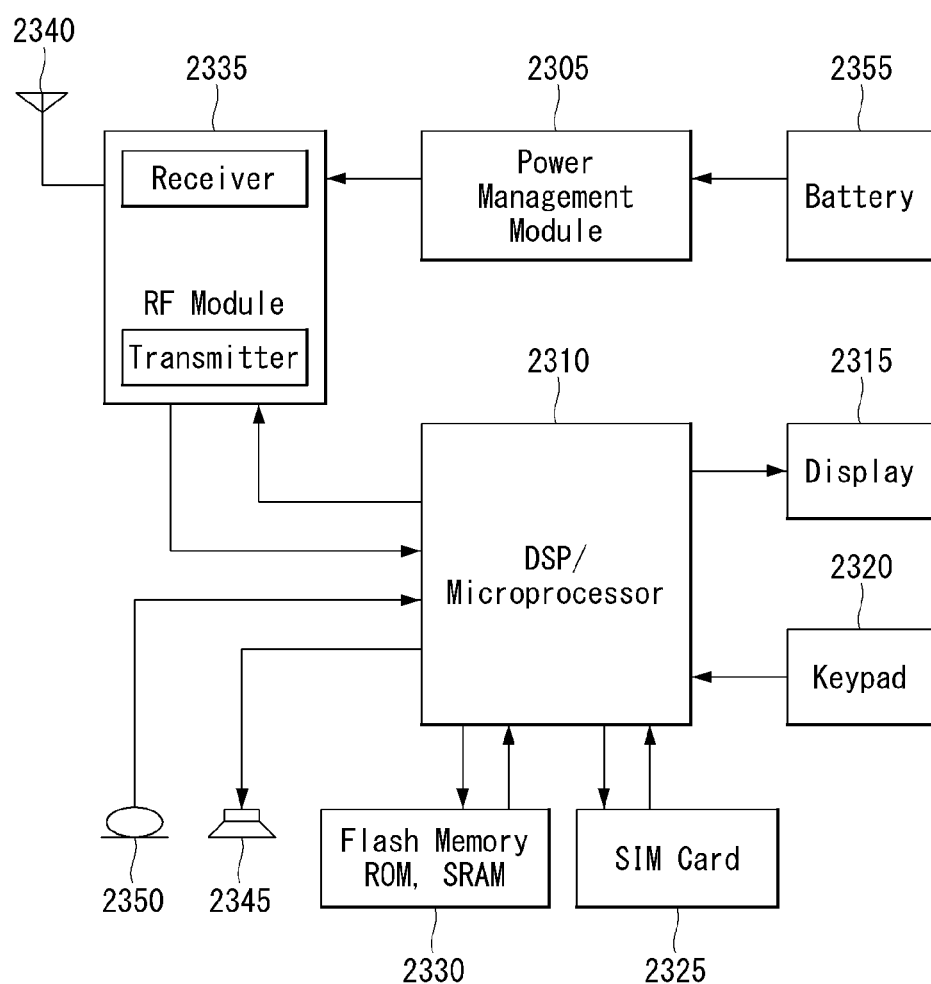

DE-REGISTRATION METHOD IN WIRELESS COMMUNICATION SYSTEM AND APPARATUS THEREFOR

CROSS-REFERENCE TO RELATED APPLICATIONS

This application is a continuation of U.S. patent application Ser. No. 16/065,126, filed on Jun. 21, 2018, now U.S. Pat. No. 10,736,072, which is the National Stage filing under 35 U.S.C. 371 of International Application No. PCT/KR2017/013352, filed on Nov. 22, 2017, which claims the benefit of U.S. Provisional Application No. 62/426,579, filed on Nov. 27, 2016, 62/439,168, filed on Dec. 27, 2016, 62/441,960, filed on Jan. 3, 2017, 62/475,885, filed on Mar. 24, 2017, and 62/545,488, filed on Aug. 15, 2017, the contents of which are all hereby incorporated by reference herein in their entirety.

TECHNICAL FIELD

The present invention relates to a wireless communication system, and more particularly, to a network-initiated deregistration method and an apparatus for performing the same.

BACKGROUND ART

A mobile communication system has been developed to provide a voice service while guaranteeing activity of a user. However, the mobile communication system extends an area up to a data service as well as a voice and at present, a short phenomenon of a resource is caused due to an explosive increase of traffic and uses require a higher-speed service, and as a result, a more developed mobile communication system is required.

Requirements of a next-generation mobile communication system largely need to support accommodation of explosive data traffic, an epochal increase of transmission rate per user, accommodation of the significantly increased number of connection devices, very low end-to-end latency, and high energy efficiency. To this end, various technologies have been researched, which include dual connectivity, massive multiple input multiple output (MIMO), in-band full duplex, non-orthogonal multiple access (NOMA), super wideband supporting, device networking, and the like.

DISCLOSURE

Technical Problem

An object of the present invention is to propose a triggered access deregistration procedure in accordance with initiation of a UE.

Further, an object of the present invention is to propose the triggered access deregistration procedure in accordance with the initiation of a network.

The technical objects of the present invention are not limited to the aforementioned technical objects, and other technical objects, which are not mentioned above, will be apparently appreciated by a person having ordinary skill in the art from the following description.

Technical Solution

In an aspect of the present invention, a network-initiated deregistration method by an access and mobility management function (AMF) in a wireless communication system includes: receiving a first message having a removal reason set to subscription withdrawn from a unified data management (UDM); and transmitting a deregistration request message for requesting the deregistration to a user equipment (UE), and the deregistration may be performed for all accesses in which the UE is registered when the removal cause received from the UDM through the first message indicates the subscription withdrawn of the UE.

Further, the deregistration request message may include access type information indicating a target access to which the deregistration is to be applied.

In addition, the access type information may indicate whether the target access is a first or second access, or the first and second accesses.

Moreover, the first access may be a 3rd Generation Partnership Project (3GPP) access and the second access may be a non-3GPP access.

Further, the deregistration method may further include, when the deregistration request message is transmitted through the 3GPP access and the UE is in a connection management (CM)-IDLE state in the 3GPP access, paging the UE.

In addition, the deregistration method may further include, when the target access is the 3GPP access or the 3GPP access and the non-3GPP access and there is an N2 signaling connection between the UE and a radio access network (RAN), transmitting, to the RAN, an N2 UE release command in which a cause is set to the deregistration to release the N2 signaling connection.

Besides, the deregistration method may further include, when the target access is 'the non-3GPP access' or 'the 3GPP access and the non-3GPP access' and there is the N2 signaling connection between the UE and a non-3GPP interworking function (N3IWF), transmitting, to the N3IWF, the N2 UE release command in which the cause is set to the deregistration to release the N2 signaling connection.

Further, the first message may further include a subscriber permanent identifier (SUPI) of the UE.

In addition, the deregistration method may further include transmitting a first deregistration response message to the UDM in response to the first message, and the first deregistration response message may include the SUPI and the access type information.

Moreover, the deregistration method may further include when the UE has a protocol data unit (PDU) session established through the target access, requesting a session management function (SMF) to release the established PDU session.

Further, the requesting of the release of the established PDU session may include transmitting a second message for requesting the release of the established PDU session to the SMF.

Besides, the second message may include the SUPI and the identifier of the PDU session to be released.

Further, the SMF may be a network entity that releases an Internet protocol (IP) address and/or prefix allocated to the PDU session to be released and releases user plane resources corresponding to the PDU session to be released.

In addition, the SMF may be a network entity that transmits an N4 session release request message for requesting the release of an N4 session to a user plane function (UPF) and the UPF may be a network entity that releases all tunnel resources and contexts associated with the N4 session.

Further, in another aspect of the present invention, an access and mobility management function (AMF) performing network-initiated deregistration in a wireless communication system includes: a communication module configured to transmit/receive a signal; and a processor configured to control the communication module, and the processor may receive a first message having a removal reason set to subscription withdrawn from a unified data management (UDM), and transmit a deregistration request message for requesting the deregistration to a user equipment (UE), and the deregistration may be performed for all accesses in which the UE is registered when the removal cause received from the UDM through the first message indicates the subscription withdrawn of the UE.

Advantageous Effects

According to an embodiment of the present invention, there is an effect that a UE-initiated deregistration procedure and a network-initiated deregistration procedure are clearly defined to eliminate ambiguity.

Further, according to an embodiment of the present invention, there is an effect that since a target access to be deregistered is implicitly/explicitly signaled, it is possible to deregister another access through a specific access.

In addition, according to an embodiment of the present invention, there is an effect that since it is possible to deregister another access through a specific access, flexibility of a deregistration procedure increases.

Effects which can be obtained in the present invention are not limited to the aforementioned effects and other unmentioned effects will be clearly understood by those skilled in the art from the following description.

DESCRIPTION OF DRAWINGS

The accompanying drawings, which are included to provide a further understanding of the invention as a part of detailed descriptions, illustrate embodiments of the invention and together with the descriptions, serve to explain the technical principles of the invention.

FIG. 1 illustrates an Evolved Packet System (EPS) to which the present invention can be applied.

FIG. 2 illustrates one example of an Evolved Universal Terrestrial Radio Access Network (E-UTRAN) to which the present invention can be applied.

FIG. 3 illustrates structures of an E-UTRAN and an EPC in a wireless communication system to which the present invention may be applied.

FIG. 4 illustrates a radio interface protocol structure between a UE and an E-UTRAN in a wireless communication system to which the present invention may be applied.

FIG. 5 is a diagram illustrating in brief the structure of a physical channel in a wireless communication system to which the present invention may be applied.

FIG. 6 is a diagram illustrating 5G system architecture using a reference point representation.

FIG. 7 is a diagram illustrating 5G system architecture using a service-based representation.

FIG. 8 illustrates NG-RAN architecture to which the present invention may be applied.

FIG. 9 is a diagram illustrating a radio protocol stack to which the present invention may be applied.

FIG. 10 illustrates RM state models to which the present invention may be applied.

FIG. 11 illustrates CM state models to which the present invention may be applied.

FIG. 12 illustrates classification and user plane marking for a QoS flow and the mapping of a QoS flow to AN resources according to an embodiment of the present invention.

FIG. 13 illustrates a UE-initiated detach procedure in an E-UTRAN that may be applied to the present invention.

FIG. 14 illustrates a UE-initiated detach procedure in a GERAN/UTRAN in which an ISR that may be applied to the present invention is activated.

FIG. 15 illustrates a UE/ePDG-initiated detach procedure having PMIPv6 on S2b that may be applied to the present invention.

FIG. 16 illustrates a UE/TWAN-initiated detach procedure and a UE/TWAN-request PDN disconnection procedure on GPT S2a that may be applied to the present invention.

FIG. 17 illustrates a UE-initiated detach procedure according to a first embodiment of the present invention.

FIG. 18 illustrates a UE-initiated deregistration procedure according to an embodiment of the present invention.

FIG. 19 illustrates a network-initiated deregistration procedure according to an embodiment of the present invention.

FIG. 20 is a flowchart illustrating a UE-initiated deregistration procedure according to an embodiment of the present invention.

FIG. 21 is a flowchart illustrating a network-initiated deregistration procedure according to an embodiment of the present invention.

FIG. 22 illustrates a block configuration diagram of a communication apparatus according to an embodiment of the present invention.

FIG. 23 illustrates a block configuration diagram of a communication apparatus according to an embodiment of the present invention.

MODE FOR INVENTION

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device or MRT apparatus): a terminal (e.g., a vending machine, meter, and so on) equipped with a communication function (e.g., communication with an MTC server through PLMN) operating through a mobile communication network and performing the MTC functions.

MTC server: a server on a network managing MTC terminals. It can be installed inside or outside a mobile communication network. It can provide an interface through which an MTC user can access the server. Also, an MTC server can provide MTC-related services to other servers (in the form of Services Capability Server (SCS)) or the MTC server itself can be an MTC Application Server.

(MTC) application: services (to which MTC is applied) (for example, remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC user: an MTC user uses a service provided by an MTC server.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal. The SCS provides the capability for a use by one or more MTC applications.

External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

Service Capability Exposure Function (SCEF): an entity in 3GPP architecture for the service capability exposure that provides a means for safely exposing a service and a capability provided by 3GPP network interface.

In what follows, the present invention will be described based on the terms defined above.

Overview of System to which the Present Invention can be Applied

FIG. 1 illustrates an Evolved Packet System (EPS) to which the present invention can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and Wimax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

FIG. 2 illustrates one example of an Evolved Universal Terrestrial Radio Access Network (E-UTRAN) to which the present invention can be applied.

The E-UTRAN system has evolved from an existing UTRAN system and may be the 3GPP LTE/LTE-A system, for example. A communication system is disposed over a wide area to provide various communication services including voice communication through IMS and packet data (for example, VoIP (Voice over Internet Protocol)).

Referring to FIG. 2, an E-UMTS network comprises an E-UTRAN, EPC, and one or more UEs. The E-UTRAN comprises eNBs providing a UE with a control plane and user plane protocols, where the eNBs are connected to each other through X2 interface.

The X2 user plane interface (X2-U) is defined among the eNBs. The X2-U interface provides non-guaranteed delivery of the user plane Protocol Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, NAS signaling transport, network sharing, MME load balancing management, and so on. The S1 interface supports many-to-many-relation between the eNB and the MME/S-GW.

An MME is capable of performing various functions such as NAS signaling security, AS (Access Stratum) security control, inter-CN (Core Network) signaling for supporting mobility among 3GPP access networks, IDLE mode UE reachability (including performing and controlling retransmission of a paging message), TAI (Tracking Area Identity) management (for IDLE and active mode UEs), PDN GW and SGW selection, MME selection for handover in which MMEs are changed, SGSN selection for handover to a 2G or 3G 3GPP access network, roaming, authentication, bearer management function including dedicated bearer establishment, and support for transmission of a PWS (Public Warning System) (including Earthquake and Tsunami Warning System (ETWS) and Commercial Mobile Alert System (CMAS)) message.

FIG. 3 illustrates structures of an E-UTRAN and an EPC in a wireless communication system to which the present invention may be applied.

Referring to FIG. 3, an eNB is capable of performing functions such as selection of a gateway (for example, MME), routing to a gateway during RRC (Radio Resource Control) activation, scheduling and transmission of a BCH (Broadcast Channel), dynamic resource allocation for a UE in uplink and downlink transmission, and mobility control connection in an LTE_ACTIVE state. As described above, a gateway belonging to an EPC is capable of performing functions such as paging origination, LTE_IDLE state management, ciphering of a user plane, SAE (System Architecture Evolution) bearer control, and ciphering of NAS signaling and integrity protection.

FIG. 4 illustrates a radio interface protocol structure between a UE and an E-UTRAN in a wireless communication system to which the present invention can be applied.

FIG. 4(a) illustrates a radio protocol structure for the control plane, and FIG. 4(b) illustrates a radio protocol structure for the user plane.

With reference to FIG. 4, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and includes unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

A logical channel lies above a transmission channel and is mapped to the transmission channel. The logical channel may be divided into a control channel for delivering control area information and a traffic channel for delivering user area information. The control channel may include a BCCH (Broadcast Control Channel), PCCH (Paging Control Channel), CCCH (Common Control Channel), DCCH (Dedicated Control Channel), and MCCH (Multicast Control Channel). The traffic channel may include a DTCH (Dedicated Traffic Channel) and MTCH (Multicast Traffic Channel). The PCCH is a downlink channel for delivering paging information and is used when a network does not know the cell to which a UE belongs. The CCCH is used by a UE that does not have an RRC connection to a network. The MCCH is a point-to-multipoint downlink channel used for delivering MBMS (Multimedia Broadcast and Multicast Service) control information from a network to a UE. The DCCH is a point-to-point bi-directional channel used by a UE with an RRC connection delivering dedicated control information between a UE and a network. The DTCH is a point-to-point channel dedicated to one UE for delivering user information that may exist in an uplink and downlink. The MTCH is a point-to-multipoint downlink channel for delivering traffic data from a network to a UE.

In the case of an uplink connection between a logical channel and a transport channel, the DCCH may be mapped to a UL-SCH, and the DTCH may be mapped to a UL-SCH, and the CCCH may be mapped to a UL-SCH. In the case of a downlink connection between a logical channel and a transport channel, the BCCH may be mapped to a BCH or DL-SCH, the PCCH may be mapped to a PCH, the DCCH may be mapped to a DL-SCH, the DTCH may be mapped to a DL-SCH, the MCCH may be mapped to an MCH, and the MTCH may be mapped to the MCH.

FIG. 5 is a diagram illustrating in brief the structure of a physical channel in a wireless communication system to which the present invention may be applied.

Referring to FIG. 5, a physical channel transfers signaling and data through radio resources including one or more subcarriers in a frequency domain and one or more symbols in a time domain.

One subframe having a length of 1.0 ms includes a plurality of symbols. A specific symbol(s) of the subframe (e.g., the first symbol of the subframe) may be used for a PDCCH. The PDCCH carries information (e.g., a resource block and modulation and coding scheme (MCS) and so on) about dynamically allocated resources.

New Generation Radio Access Network (NG-RAN) (or RAN) System

Terms used in a new generation radio access network may be defined as follows.

Evolved packet system (EPS): a network system including an evolved packet core (EPC), that is, an Internet protocol (IP)-based packet switched core network, and an access to network such as LTE or UTRAN. A network is an evolved network form of universal mobile telecommunications system (UMTS).

eNodeB: an eNB of an EPS network. It is disposed outdoors and has coverage of a macro cell volume.

International Mobile Subscriber Identity (IMSI): a user identity internationally uniquely allocated in a mobile communication network.

Public Land Mobile Network (PLMN): a network configured to provide persons with a mobile communication service. It may be differently configured for each operator.

5G system (5GS): a system including a 5G access network (AN), a 5G core network and a user equipment (UE).

5G access network (5G-AN) (or AN): an access network including a new generation radio access network (NG-RAN) and/or a non-3GPP access network (non-3GPP AN) connected to a 5G core network.

New generation radio access network (NG-RAN) (or RAN): a radio access network having a common characteristic in that it is connected to 5GC and supporting one or more of the following options:

1) Standalone new radio.
2) New radio, that is, an anchor supporting an E-UTRA extension.
3) Standalone E-UTRA (e.g., eNodeB).
4) Anchor supporting a new radio extension 5G core network (5GC): a core network connected to a 5G access network Network function (NF): it means a processing function adopted in 3GPP within a network or defined in 3GPP. The processing function includes a defined functional behavior and an interface defined in 3GPP.

NF service: it is a (consumed) function exposed by an NF through a service-based interface and used by another authenticated NF(s).

Network slice: a logical network providing a specific network capability(s) and network characteristic(s).

Network slice instance: a set of NF instance(s) forming a network slice and required resource(s) (e.g., calculation, storage and networking resources)

Protocol data unit (PDU) connectivity service: a service providing the exchange of PDU(s) between a UE and a data network.

PDU session: an association providing PDU connectivity service between a UE and a data network. An association type may be an Internet protocol (IP) or Ethernet or may be unstructured.

Non-access stratum (NAS): a functional layer for exchanging signaling or traffic messages between a UE and a core network in an EPS, 5GS protocol stack. It has a main function of supporting the mobility of a UE and supporting a session management procedure.

5G System Architecture to which the Present Invention May be Applied

A 5G system is a technology advanced from the $4^{th}$ generation LTE mobile communication technology and a new radio access technology (RAT) through the evolution of the existing mobile communication network structure or a clean-state structure and an extended technology of long term evolution (LTE), and it supports extended LTE (eLTE), non-3GPP (e.g., WLAN) access and so on.

A 5G system is defined based on a service, and an interaction between network functions (NFs) within architecture for a 5G system may be expressed by two methods as follows.

Reference point representation (FIG. 6): indicates an interaction between NF services within NFs described by a point-to-point reference point (e.g., N11) between two NFs (e.g., AMF and SMF).

Service-based representation (FIG. 7): network functions (e.g., AMFs) within a control plane (CP) permit other authenticated network functions to access its own service. If this representation is necessary, it also includes a point-to-point reference point.

FIG. 6 is a diagram illustrating 5G system architecture using a reference point representation.

Referring to FIG. 6, the 5G system architecture may include various elements (i.e., a network function (NF)). This drawing illustrates an authentication server function (AUSF), a (core) access and mobility management function (AMF), a session management function (SMF), a policy control function (PCF), an application function (AF), united data management (UDM), a data network (DN), a user plane function (UPF), a (radio) access network ((R)AN) and a user equipment (UE) corresponding to some of the various elements.

Each of the NFs supports the following functions.

AUSF stores data for the authentication of a UE.

AMF provides a function for access of a UE unit and mobility management and may be basically connected to one AMF per one UE.

Specifically, the AMF supports functions, such as signaling between CN nodes for mobility between 3GPP access networks, the termination of a radio access network (RAN) CP interface (i.e., N2 interface), the termination (N1) of NAS signaling, NAS signaling security (NAS ciphering and integrity protection), AS security control, registration area management, connection management, idle mode UE reachability (including control and execution of paging retransmission), mobility management control (subscription and policy), intra-system mobility and inter-system mobility support, the support of network slicing, SMF selection, lawful interception (for an AMF event and an interface to an LI system), the provision of transfer of a session management (SM) message between a UE and an SMF, a transparent proxy for SM message routing, access authentication, access authorization including a roaming right check, the provision of transfer of an SMS message between a UE and an SMSF (SMS(Short Message Service) function), a security anchor function (SEA) and/or security context management (SCM).

Some or all of the functions of the AMF may be supported within a single instance of one AMF.

DN means an operator service, Internet access or a $3^{rd}$ party service, for example. The DN transmits a downlink protocol data unit (PDU) to an UPF or receives a PDU, transmitted by a UE, from a UPF.

PCF provides a function for receiving information about a packet flow from an application server and determining a policy, such as mobility management and session management. Specifically, the PCF supports functions, such as the support of a unified policy framework for controlling a network behavior, the provision of a policy rule so that a CP function(s) (e.g., AMF or SMF) can execute a policy rule, and the implementation of a front end for accessing related subscription information in order to determine a policy within user data repository (UDR).

SMF provides a session management function and may be managed by a different SMF for each session if a UE has a plurality of sessions.

Specifically, the SMF supports functions, such as session management (e.g., session setup, modification and release including the maintenance of a tunnel between a UPF and an AN node), UE IP address allocation and management (optionally including authentication), the selection and control of the UP function, a traffic steering configuration for routing traffic from the UPF to a proper destination, the termination of an interface toward policy control functions, the execution of the control part of a policy and QoS, lawful interception (for an SM event and an interface to an LI system), the termination of the SM part of an NAS message, downlink data notification, the initiator of AN-specific SM information (transferred to an AN through N2 via the AMF), the determination of an SSC mode of a session, and a roaming function.

Some or all of the functions of the SMF may be supported within a single instance of one SMF.

UDM stores the subscription data of a user, policy data, etc. UDM includes two parts, that is, an application front end (FE) and user data repository (UDR).

The FE includes a UDM FE responsible for the processing of location management, subscription management and credential and a PCF responsible for policy control. The UDR stores data required for functions provided by the UDM-FE and a policy profile required by the PCF. Data stored within the UDR includes user subscription data, including a subscription ID, security credential, access and mobility-related subscription data and session-related subscription data, and policy data. The UDM-FE supports functions, such as access to subscription information stored in the UDR, authentication credential processing, user identification handling, access authentication, registration/mobility management, subscription management, and SMS management.

UPF transfers a downlink PDU, received from a DN, to a UE via an (R)AN and transfers an uplink PDU, received from a UE, to a DN via an (R)AN.

Specifically, the UPF supports functions, such as an anchor point for intra/inter RAT mobility, the external PDU session point of interconnection to a data network, packet routing and forwarding, a user plane part for the execution of packet inspection and a policy rule, lawful interception, a traffic usage report, an uplink classifier for supporting the routing of traffic flow of a data network, a branching point for supporting a multi-home PDU session, QoS handling (e.g., the execution of packet filtering, gating and an uplink/downlink rate) for a user plane, uplink traffic verification (SDF mapping between a service data flow (SDF) and a QoS flow), transport level packet marking within the uplink and downlink, downlink packet buffering, and a downlink data notification triggering function. Some or all of the functions of the UPF may be supported within a single instance of one UPF.

AF interoperates with a 3GPP core network in order to provide services (e.g., support functions, such as an application influence on traffic routing, network capability exposure access, an interaction with a policy framework for policy control).

(R)AN collectively refers to a new radio access network supporting all of evolved E-UTRA (E-UTRA) and new radio (NR) access technologies (e.g., gNB), that is, an advanced version of the 4G radio access technology.

The gNB supports functions for radio resource management (i.e., radio bearer control and radio admission control), connection mobility control, the dynamic allocation (i.e., scheduling) of resources to a UE in the uplink/downlink, Internet protocol (IP) header compression, the encryption and integrity protection of a user data stream, the selection of an AMF upon attachment of a UE if routing to the AMF has not been determined based on information provided to the UE, the selection of an AMF upon attachment of a UE, user plane data routing to an UPF(s), control plane information routing to an AMF, connection setup and release, the scheduling and transmission of a paging message (generated from an AMF), the scheduling and transmission of system broadcast information (generated from an AMF or operation and maintenance (O&M)), a measurement and measurement report configuration for mobility and scheduling, transport level packet marking in the uplink, session management, the support of network slicing, QoS flow management and mapping to a data radio bearer, the support of a UE that is an inactive mode, the distribution function of an NAS message, an NAS node selection function, radio access network sharing, dual connectivity, and tight interworking between an NR and an E-UTRA.

UE means a user device. A user apparatus may be called a term, such as a terminal, a mobile equipment (ME) or a mobile station (MS). Furthermore, the user apparatus may be a portable device, such as a notebook, a mobile phone, a personal digital assistant (PDA), a smartphone or a multimedia device, or may be a device that cannot be carried, such as a personal computer (PC) or a vehicle-mounted device.

In the drawings, for the clarity of description, an unstructured data storage network function (UDSF), a structured data storage network function (SDSF), a network exposure function (NEF) and an NF repository function (NRF) are not shown, but all of the NFs shown in this drawing may perform mutual operations along with the UDSF, NEF and NRF, if necessary.

NEF provides means for safely exposing services and capabilities provided by 3GPP network functions, for example, for a $3^{rd}$ party, internal exposure/re-exposure, an application function, and edge computing. The NEF receives information from other network function(s) (based on the exposed capability(s) of other network function(s)). The NEF may store information received as structured data using a standardized interface as a data storage network function. The stored information is re-exposed to other network function(s) and application function(s) by the NEF and may be used for other purposes, such as analysis.

NRF supports a service discovery function. It receives an NF discovery request from an NF instance and provides information of a discovered NF instance to an NF instance. Furthermore, it maintains available NF instances and services supported by the available NF instances.

SDSF is an optional function for supporting a function of storing and retrieving information as structured data by any NEF.

UDSF is an optional function for supporting a function of storing and retrieving information as unstructured data by any NF.

In the 5G system, a node which is responsible for wireless transmission/reception with the UE is gNB and plays the same role as the eNB in the EPS. When the UE is simultaneously connected to the 3GPP connection and the non-3GPP connection, the UE receives a service through one AMF as illustrated in FIG. 6. In FIG. 6, it is illustrated that a connection is made by the non-3GPP connection and a connection is made by the 3GPP connection are connected to one same UPF, but the connection is not particularly required and may be connected by a plurality of different UPFs.

However, when the UE selects N3IWK (also referred to as non-3GPP interworking function (N3IWF)) in the HPLMN in the roaming scenario and is connected to the non-3GPP connection, the AMF that manages the 3GPP connection may be located in the VPLMN and the AMF that manages the non-3GPP connection may be located in the HPLMN.

The non-3GPP access network is connected to the 5G core network via N3IWK/N3IWF. The N3IWK/N3IWF interfaces the 5G core network control plane function and user plane function via the N2 and N3 interfaces, respectively.

A representative example of the non-3GPP connection mentioned in the present specification may be a WLAN connection.

Meanwhile, this drawing illustrates a reference model if a UE accesses one DN using one PDU session, for convenience of description, but the present invention is not limited thereto.

A UE may access two (i.e., local and central) data networks at the same time using multiple PDU sessions. In this case, for different PDU sessions, two SMFs may be selected. In this case, each SMF may have the ability to control both a local UPF and central UPF within a PDU session.

Furthermore, a UE may access two (i.e., local and central) data networks provided within one PDU session at the same time.

In the 3GPP system, a conceptual link that connects NFs within the 5G system is defined as a reference point. The following illustrates reference points included in 5G system architecture represented in this drawing.

N1: a reference point between a UE and an AMF
N2: a reference point between an (R)AN and an AMF
N3: a reference point between an (R)AN and a UPF
N4: a reference point between an SMF and a UPF
N5: a reference point between a PCF and an AF
N6: a reference point between a UPF and a data network
N7: a reference point between an SMF and a PCF
N24: a reference point between a PCF within a visited network and a PCF within a home network
N8: a reference point between a UDM and an AMF
N9: a reference point between two core UPFs
N10: a reference point between a UDM and an SMF
N11: a reference point between an AMF and an SMF
N12: a reference point between an AMF and an AUSF
N13: a reference point between a UDM and an authentication server function (AUSF)
N14: a reference point between two AMFs
N15: a reference point between a PCF and an AMF in the case of a non-roaming scenario and a reference point between a PCF within a visited network and an AMF in the case of a roaming scenario
N16: a reference point between two SMFs (in the case of a roaming scenario, a reference point between an SMF within a visited network and an SMF within a home network)
N17: a reference point between an AMF and an EIR
N18: a reference point between any NF and an UDSF
N19: a reference point between an NEF and an SDSF FIG. 7 is a diagram illustrating 5G system architecture using a service-based representation.

A service-based interface illustrated in this drawing shows a set of services provided/exposed by a specific NF. The service-based interface is used within a control plane. The following illustrates service-based interfaces included in the 5G system architecture represented as in this drawing.

Namf: a service-based interface exhibited by an AMF
Nsmf: a service-based interface exhibited by an SMF
Nnef: a service-based interface exhibited by an NEF
Npcf: a service-based interface exhibited by a PCF
Nudm: a service-based interface exhibited by a UDM
Naf: a service-based interface exhibited by an AF
Nnrf: a service-based interface exhibited by an NRF
Nausf: a service-based interface exhibited by an AUSF NF service is a kind of capability exposed to another NF (i.e., NF service consumer) by an NF (i.e., NF service supplier) through a service-based interface. The NF may expose one or more NF service(s). In order to define NF service, the following criteria are applied:

NF services are derived from an information flow for describing an end-to-end function.

A complete end-to-end message flow is described by the sequence of NF service invocation.

Two operations for NF(s) to provide their services through service-based interfaces are as follows:

i) "Request-response": a control plane NF_B (i.e., NF service supplier) receives a request to provide a specific NF service (including the execution of an operation and/or the provision of information) from another control plane NF_A (i.e., NF service consumer). NF_B sends NF service results based on information provided by NF_A within a request as a response.

In order to satisfy a request, NF_B may alternately consume NF services from other NF(s). In the request-response mechanism, communication is performed in a one-to-one manner between two NFs (i.e., consumer and supplier).

ii) "subscribe-notify"

A control plane NF_A (i.e., NF service consumer) subscribes to an NF service provided by another control plane NF_B (i.e., NF service supplier). A plurality of control plane NF(s) may subscribe to the same control plane NF service. NF_B notifies interested NF(s) that have subscribed to NF services of the results of the NF services. A subscription request from a consumer may include a notification request for notification triggered through periodical update or a specific event (e.g., the change, specific threshold arrival, etc. of requested information). The mechanism also includes a case where NF(s) (e.g., NF_B) implicitly subscribe to specific notification without an explicit subscription request (e.g., due to a successful registration procedure).

FIG. 8 illustrates NG-RAN architecture to which the present invention may be applied.

Referring to FIG. 8, a new generation radio access network (NG-RAN) includes an NR NodeB (gNB)(s) and/or an eNodeB (eNB)(s) for providing the termination of a user plane and control plane protocol toward a UE.

An Xn interface is connected between gNBs and between a gNB(s) and an eNB(s) connected to 5GC. The gNB(s) and the eNB(s) are also connected to 5GC using an NG interface. More specifically, the gNB(s) and eNB(s) are also connected to an AMF using an NG-C interface (i.e., N2 reference point), that is, a control plane interface between an NG-RAN and 5GC and are connected to a UPF using an NG-U interface (i.e., N3 reference point), that is, a user plane interface between an NG-RAN and 5GC.

Radio Protocol Architecture

FIG. 9 is a diagram illustrating a radio protocol stack to which the present invention may be applied. Specifically, FIG. 9(a) illustrates a radio interface user plane protocol stack between a UE and a gNB, and FIG. 9(b) illustrates a radio interface control plane protocol stack between the UE and the gNB.

A control plane means a passage through which control messages are transmitted in order for a UE and a network to manage a call. A user plane means a passage through which data generated in an application layer, for example, voice data or Internet packet data is transmitted.

Referring to FIG. 9(a), the user plane protocol stack may be divided into a first layer (Layer 1) (i.e., a physical layer (PHY) layer) and a second layer (Layer 2).

Referring to FIG. 9(b), the control plane protocol stack may be divided into a first layer (i.e., a PHY layer), a second layer, a third layer (i.e., a radio resource control (RRC) layer) and a non-access stratum (NAS) layer.

The second layer is divided into a medium access control (MAC) sublayer, a radio link control (RLC) sublayer, a packet data convergence protocol (PDC) sublayer, and a service data adaptation protocol (SDAP) sublayer (in the case of a user plane).

Radio bearers are classified into two groups: a data radio bearer (DRB) for user plane data and a signaling radio bearer (SRB) for control plane data Hereinafter, the layers of the control plane and user plane of the radio protocol are described.

1) The PHY layer, that is, the first layer, provides information transfer service to a higher layer using a physical channel. The PHY layer is connected to the MAC sublayer located in a high level through a transport channel. Data is transmitted between the MAC sublayer and the PHY layer through a transport channel. The transport channel is classified depending on how data is transmitted according to which characteristics through a radio interface. Furthermore, data is transmitted between different physical layers, that is, between the PHY layer of a transmission stage and the PHY layer of a reception stage through a physical channel.

2) The MAC sublayer performs mapping between a logical channel and a transport channel; the multiplexing/demultiplexing of an MAC service data unit (SDU) belonging to one logical channel or different logical channels to/from a transport block (TB) transferred to/from the PHY layer through a transport channel; a scheduling information report; error correction through a hybrid automatic repeat request (HARQ); priority handling between UEs using dynamic scheduling; priority handling between the logical channels of one UE using logical channel priority; and padding.

Different types of data transfer service provided by the MAC sublayer. Each logical channel type defines that information of which type is transferred.

Logical channels are classified into two groups: a control channel and a traffic channel.

i) The control channel is used to transfer only control plane information and is as follows.

Broadcast control channel (BCCH): a downlink channel system for broadcasting control information.

Paging control channel (PCCH): a downlink channel transferring paging information and system information change notification.

Common control channel (CCCH): a channel for transmitting control information between a UE and a network. This channel is used for UEs not having an RRC connection with a network.

Dedicated control channel (DCCH): a point-to-point bidirectional channel for transmitting dedicated control information between a UE and a network. It is used by a UE having an RRC connection.

ii) The traffic channel is used to use only user plane information:

Dedicated traffic channel (DTCH): a point-to-point channel for transferring user information and dedicated to a single UE. The DTCH may be present in both the uplink and downlink.

In the downlink, a connection between a logical channel and a transport channel is as follows.

A BCCH may be mapped to a BCH. A BCCH may be mapped to a DL-SCH. A PCCH may be mapped to a PCH. A CCCH may be mapped to a DL-SCH. A DCCH may be mapped to a DL-SCH. A DTCH may be mapped to a DL-SCH.

In the uplink, a connection between a logical channel and a transport channel is as follows. A CCCH may be mapped to an UL-SCH. A DCCH may be mapped to an UL-SCH. A DTCH may be mapped to an UL-SCH.

3) The RLC sublayer supports three transport modes: a transparent mode (TM), an unacknowledged mode (UM) and acknowledged mode (AM).

An RLC configuration may be applied to each logical channel. In the case of an SRB, the TM or AM mode is used. In contrast, in the case of a DRB, the UM or AM mode is used.

The RLC sublayer performs the transfer a higher layer PDU; independent sequence numbering with a PDCP; error correction through an automatic repeat request (ARW); segmentation and re-segmentation; the reassembly of an SDU; RLC SDU discard; and RLC re-establishment.

4) The PDCP sublayer for a user plane performs sequence numbering; header compression and compression-decompression (corresponding to only robust header compression (RoHC)); user data transfer; reordering and duplicate detection (if there is transfer to a layer higher than the PDCP); PDCP PDU routing (in the case of a split bearer); the retransmission of a PDCP SDU; ciphering and deciphering; PDCP SDU discard; PDCP re-establishment and data recovery for RLC AM; and the duplication of a PDCP PDU.

The PDCP sublayer a control plane additionally performs sequence numbering; ciphering, deciphering and integrity protection; control plane data transfer; duplication detection; the duplication of a PDCP PDU.

When duplication for a radio bearer is configured by RRC, an additional RLC entity and an additional logical channel are added to a radio bearer in order to control a duplicated PDCP PDU(s). In the PDCP, duplication includes transmitting the same PDCP PDU(s) twice. The first one is transferred to the original RLC entity, and the second one is transferred to an additional RLC entity. In this case, the duplication corresponding to the original PDCP PDU is not transmitted to the same transport block. Different two logical channels may belong to the same MAC entity (in the case of a CA) or to different MAC entities (in the case of DC). In the former case, a logical channel mapping restriction is used to guarantee that a duplication corresponding to the original PDCP PDU is not transferred to the same transport block.

5) The SDAP sublayer performs i) mapping between a QoS flow and a data radio bearer and ii) QoS flow ID marking within a downlink and uplink packet.

One protocol entity of an SDAP is configured for each PDU session, but exceptionally in the case of dual connectivity (DC), two SDAP entities may be configured.

6) The RRC sublayer performs the broadcasting of system information related to an access stratum (AS) and a non-access stratum (NAS); paging initiated by 5GC or an NG-RAN; the establishment, maintenance and release (additionally including the modification and release of a carrier aggregation and additionally including the modification and release of dual connectivity between an E-UTRAN and an NR or within an NR) of an RRC connection between a UE and an NG-RAN; a security function including key management; the establishment, configuration, maintenance and release of an SRB(s) and a DRB(s); handover and context transfer; control of UE cell selection, re-release and cell selection/reselection; a mobility function including mobility between RATs; a QoS management function, a UE measurement report and report control; the detection of a radio link failure and recovery from a radio link failure; and the transfer of an NAS message from an NAS to a UE and the transfer of an NAS message from a UE to an NAS.

Network Slicing

A 5G system has introduced a network slicing technology which provides network resources and network functions to an independent slice based on each service.

As network slicing is introduced, the isolation, independent management, etc. of a network function and network resources can be provided for each slice. Accordingly, services that are independent for each service or user and that are more flexible can be provided by selecting and combining network functions of the 5G system depending on a service or user.

A network slice refers to a network that logically integrates an access network and a core network.

The network slice may include one or more of the followings:

Core network control plane and user plane function
NG-RAN
Non-3GPP interworking function (N3IWF) toward a non-3GPP access network A function supported for each network slice and network function optimization may be different. A plurality of network slice instances may provide the same function to different groups of UEs.

One UE may be connected to one or more network slice instances at the same time via a 5G-AN. One UE may be served at the same time by a maximum of 8 network slices. An AMF instance that serves a UE may belong to each network slice instance that serves the UE. That is, the AMF instance may be common to a network slice instance that serves the UE. The CN part of a network slice instance(s) that serves a UE is selected by a CN.

One PDU session belongs to only a specific one network slice instance for each PLMN. Different network slice instances do not share one PDU session.

One PDU session belongs to a specific one network slice instance for each PLMN. Different slices may have slice-specific PDU sessions using the same DNN, but different network slice instances do not share one PDU session.

Single network slice selection assistance information (S-NSSAI) identifies a network slice. Each S-NSSAI is assistant information used for a network to select a specific network slice instance. The NSSAI is a set of S-NSSAI(s). The S-NSSAI includes the followings:

Slice/service type (SST): the SST indicates the operation of a network slice expected form a viewpoint of a function and service.

Slice differentiator (SD): the SD is optional information that supplements an SST(s) for selecting a network slice instance from a plurality of potential network slice instances all of which comply with an indicated SST.

1) Upon Initial Access, Network Slice Selection

A Configured NSSAI may be configured in a UE by a home PLMN (HPLMN) for each PLMN. The Configured NSSAI becomes PLMN-specific, and the HPLMN indicates a PLMN(s) to which each Configured NSSAI has been applied.

Upon initial connection of a UE, an RAN selects an initial network slice that will transfer a message using an NSSAI. To this end, in a registration procedure, a UE provides a requested NSSAI to a network. In this case, when the UE provides the requested NSSAI to the network, a UE within a specific PLMN uses only S-NSSAIs belonging to the Configured NSSAI of the corresponding PLMN.

If a UE does not provide an NSSAI to an RAN and an RAN does not select a proper network slice based on the provided NSSAI, the RAN may select a default network slice.

Subscription data includes the S-NSSAI(s) of a network slice(s) to which a UE has subscribed. One or more S-NSSAI(s) may be marked as a default S-NSSAI. When an S-NSSAI is marked by default, although a UE does not transmit any S-NSSAI to a network within a Registration Request, the network may serve the UE through a related network slice.

When a UE is successfully registered, a CN notifies an (R)AN of all of Allowed NSSAIs (including one or more S-NSSAIs) by providing the NSSAIs.

Furthermore, when the registration procedure of the UE is successfully completed, the UE may obtain an Allowed NSSAI for a PLMN from an AMF.

The Allowed NSSAI has precedence over the Configured NSSAI for the PLMN. Thereafter, the UE uses only an S-NSSAI(s) within the Allowed NSSAI corresponding to a network slice for a network slice selection-related procedure within the serving PLMN.

In each PLMN, a UE stores a Configured NSSAI and an Allowed NSSAI (if present). When the UE receives an Allowed NSSAI for a PLMN, it overrides the previously stored Allowed NSSAI for the PLMN.

2) Slice Change

A network may change an already selected network slice instance depending on a local policy and the mobility, subscription information change, etc. of a UE. That is, a set of network slices of a UE may be changed at any time while the UE is registered with a network. Furthermore, a change of a set of network slices of a UE may be initiated by a network or under specific conditions.

A network may change a set of allowed network slice(s) with which a UE has been registered based on a local policy, a subscription information change and/or the mobility of the UE. A network may perform such a change during a registration procedure or may notify a UE of a change of a supported network slice(s) using a procedure capable of triggering a registration procedure.

Upon changing the network slice, the network may provide the UE with a new Allowed NSSAI and a tracking area list. The UE includes the new NSSAI in signaling according to a mobility management procedure and transmits the signaling, thereby causing the reselection of a slice instance. An AMF supporting the slice instance may also be changed in response to a change of the slice instance.

When a UE enters an area in which a network slice is no longer available, a core network releases a PDU session for an S-NSSAI corresponding to a network slice that is no longer available through a PDU session release procedure.

When the PDU session corresponding to the slice that is no longer available is released, the UE determines whether the existing traffic can be routed through a PDU session belonging to another slice using a UE policy.

For a change of a set of used S-NSSAI(s), a UE initiates a registration procedure.

3) SMF Selection

A PCF provides a UE with a network slice selection policy (NSSP). The NSSP associates the UE with an S-NSSAI and is used by the UE in order to determine a PDU session to which traffic will be routed.

A network slice selection policy is provided for each application of a UE. This includes a rule by which an S-NSSAI can be mapped for each UE application. The AMF selects an SMF for PDU session management using subscriber information and a local operator policy along with an SM-NSSAI transferred by a UE and DNN information.

When a PDU session for a specific slice instance is established, a CN provides an (R)AN with an S-NSSAI corresponding to the slice instance to which the PDU session belongs so that an RAN can access a specific function of a slice instance.

Session Management

5GC supports a PDU connectivity service, that is, a service that provides the exchange of PDU(s) between a UE and a DN identified by a data network name (DNN) (or an access point name (APN)). The PDU connectivity service is also supported through a PDU session established upon request from the UE.

Each PDU session supports a single PDU session type. That is, when the PDU session is established, it supports the exchange of PDUs of a single type requested by a UE. The following PDU session types are defined. IP version 4 (IPv4), IP version 6 (IPv6), Ethernet, and unstructured. In this case, the type of PDUs exchanged between a UE and a DN are completely transparent in a 5G system.

A PDU session is established using NAS SM signaling exchanged between a UE and an SMF through N1 (upon UE request), modified (upon UE and 5GC request), and released (upon UE and 5GC request). Upon request from an application server, 5GC may trigger a specific application within a UE. When the UE receives a trigger message, it transfers the corresponding message to an identified application. The identified application may establish a PDU session with a specific DNN.

An SMF checks whether a UE request complies with user subscription information. To this end, the SMF obtains SMF level subscription data from UDM. Such data may indicate an accepted PDU session type for each DNN:

A UE registered through a plurality of accesses selects access for setting up a PDU session.

A UE may request to move a PDU session between 3GPP and non-3GPP access. A determination for moving the PDU session between 3GPP and non-3GPP access is made for each PDU session. That is, the UE may have a PDU session using 3GPP access while another PDU session uses non-3GPP access.

Within a PDU session setup request transmitted by a network, a UE provides a PDU session identity (ID). Furthermore, the UE may provide a PDU session type, slicing information, a DNN, service and a session continuity (SSC) mode.

A UE may establish a plurality of PDU sessions with the same DN or different DNs at the same time via 3GPP access and/or via non-3GPP access.

A UE may establish a plurality of PDU sessions with the same DN served by a different UPF end N6.

A UE having a plurality of established PDU sessions may be served by different SMFs.

The user plane path of a different PDU sessions belonging to the same UE (the same or different DNNs) may be fully separated between an UPF and AN interfacing with a DN.

5G system architecture can satisfy various continuity requirements of different application/services within a UE by supporting a session and service continuity (SCC). A 5G system supports different SSC modes. An SSC mode associated with a PDU session anchor is not changed while a PDU session is established.

In the case of a PDU session to which SSC Mode 1 is applied, a network maintains continuity service provided to a UE. In the case of a PDU session of an IP type, an IP address is maintained.

If SSC Mode 2 is used, a network may release continuity service delivered to a UE. Furthermore, the network may release a corresponding PDU session. In the case of a PDU session of an IP type, a network may release an IP address(es) allocated to a UE.

If SSC Mode 3 is used, a change of a user plane can be aware by a UE, but a network guarantees that the UE does not lose connectivity. In order to permit better service continuity, a connection through a new PDU session anchor point is established before a previous connection is terminated. In the case of a PDU session of an IP type, an IP address is not maintained while an anchor is deployed again.

An SSC mode selection policy is used to determine the type of SSC mode associated with an application (or application group) of a UE. An operator may previously configure an SSC mode selection policy in a UE. The policy includes one or more SSC mode selection policy rules which may be used for a UE to determine the type of SSC mode associated with an application (or a group of applications). Furthermore, the policy may include a default SSC mode selection policy rule which may be applied to all of applications of a UE.

If a UE provides an SSC mode when it requests a new PDU session, an SMF selects whether it will accept the requested SSC mode or whether it will modify the requested SSC mode based on subscription information and/or a local configuration. If a UE does not provide an SSC mode when it requests a new PDU session, an SMF selects a default SSC mode for data networks listed within subscription information or applies a local configuration for selecting an SSC mode.

An SMF notifies a UE of an SSC mode selected for a PDU session.

Mobility Management

Registration management (RM) is used to register or deregister a UE/user with/from a network and to establish user context within a network.

1) Registration Management

A UE/user needs to register a network in order to receive service that requests registration. Once the UE/user is registered, the UE may update its own registration with the network in order to periodically maintain reachability (periodical registration update) if applicable, upon moving (mobility registration update), or in order to update its own capability or negotiate a protocol parameter again.

An initial registration procedure includes the execution of a network access control function (i.e., user authentication and access authentication based on a subscription profile within UDM). As the results of the registration procedure, the ID of a serving AMF within the UDM is registered.

FIG. 10 illustrates RM state models to which the present invention may be applied. Specifically, FIG. 10(a) shows an RM state model within a UE, and FIG. 10(b) shows an RM state model within an AMF.

Referring to FIG. 10, in order to reflect the registration state of a UE within a selected PLMN, two RM states of RM-DEREGISTERED and RM-REGISTERED are used within the UE and the AMF.

In the RM-DEREGISTERED state, the UE is not registered with a network. The valid location or routing information of UE context within the AMF is not maintained. Accordingly, the UE is not reachable by the AMF. However, for example, in order to prevent an authentication procedure from being executed for each registration procedure, some UE context may be still stored in the UE and the AMF.

In the RM-DEREGISTERED state, if the UE needs to receive service that requests registration, the UE attempts registration with a selected PLMN using the initial registration procedure. Alternatively, upon initial registration, when the UE receives a Registration Reject, the UE remains in the RM-DEREGISTERED state. In contrast, when the UE receives the Registration Accept, it enters the RM-REGISTERED state.

In the RM-DEREGISTERED state, if applicable, the AMF accepts the initial registration of the UE by transmitting a Registration Accept to the UE, and enters the RM-REGISTERED state. Alternatively, if applicable, the AMF rejects the initial registration of the UE by transmitting a Registration Reject to the UE.

In the RM-REGISTERED state, the UE is registered with the network. In the RM-REGISTERED state, the UE may receive service that requests registration with the network.

In the RM-REGISTERED state, if the tracking area identity (TAI) of a current serving cell is not present within a list of TAIs that has been received by the UE from a network, the registration of the UE is maintained. The UE performs a mobility registration update procedure so that the AMF can page the UE. Alternatively, in order to notify a network that the UE is still in the active state, the UE performs a periodic registration update procedure when a periodical update timer expires. Alternatively, in order to update its own capability information or negotiate a protocol parameter with a network again, the UE performs a registration update procedure. Alternatively, if the UE does no longer require registration with a PLMN, the UE performs a deregistration procedure and enters the RM-DEREGISTERED state. The UE may determine deregistration from the network at any time. Alternatively, when the UE receives a Registration Reject message, a Deregistration message or performs a local deregistration procedure without the initiation of any signaling, it enters the RM-DEREGISTERED state.

In the RM-REGISTERED state, when the UE does no longer need to be registered with the PLMN, the AMF performs a deregistration procedure and enters the RM-DEREGISTERED state. The AMF may determine the deregistration of the UE at any time. Alternatively, after an implicit deregistration timer expires, the AMF performs implicit deregistration at any time. The AMF enters the RM-DEREGISTERED state after the implicit deregistration. Alternatively, the AMF performs local deregistration for the UE that has negotiated deregistration at the end of communication. The AMF enters the RM-DEREGISTERED state after local deregistration. Alternatively, if applicable, the AMF accepts or rejects registration update from the UE. The AMF may reject UE registration when it rejects the registration update from the UE.

Registration area management includes a function for allocating or re-allocating a registration area to the UE. The registration area is managed for each access type (i.e., 3GPP access or non-3GPP access).

When the UE is registered with a network through 3GPP access, the AMF allocates a set of tracking area (TA)(s) within a TAI list to the UE. When the AMF allocates a registration area (i.e., a set of TAs within the TAI list), the AMF may consider various types of information (e.g., a mobility pattern and an accepted/non-accepted area). The AMP having the whole PLMN or all of PLMNs as a serving area may allocate the whole PLMN, that is, a registration area, to the UE in the MICO mode.

A 5G system supports the allocation of a TAI list including different 5G-RAT(s) within a single TAI list.

When the UE is registered with a network through non-3GPP access, a registration area for the non-3GPP access corresponds to a unique reserved TAI value (i.e., dedicated to the non-3GPP access). Accordingly, there is a unique TA for the non-3GPP access to 5GC, which is called an N3GPP TAI.

When the TAI list is generated, the AMF includes only a TAI(s) applicable to access through which the TAI list has been transmitted.

2) Connection Management

Connection management (CM) is used to establish and release a signaling connection between the UE and the AMF. CM includes a function of establishing and releasing a signaling connection between the UE and the AMF through N1. The signaling connection is used to enable an NAS signaling exchange between the UE and a core network. The signaling connection includes both an AN signaling connection for the UE between the UE and the AN and an N2 connection for the UE between the AN and the AMF.

FIG. 11 illustrates CM state models to which the present invention may be applied. Specifically, FIG. 11 (a) illustrates a CM state shift within a UE, and FIG. 11 (b) shows a CM state shift within an AMF.

Referring to FIG. 11, in order to reflect the NAS signaling connection of the UE with the AMF, two CM states of CM-IDLE and CM-CONNECTED are used.

The UE in the CM-IDLE state is the RM-REGISTERED state and does not have an NAS signaling connection established with the AMF through N1. The UE performs cell selection, cell reselection and PLMN selection.

An AN signaling connection, an N2 connection and an N3 connection for the UE in the CM-IDLE state are not present.

In the CM-IDLE state, if the UE is not in the MICO mode, it responds to paging by performing a Service Request procedure (if it has received it). Alternatively, when the UE has uplink signaling or user data to be transmitted, it performs a Service Request procedure. Alternatively, whenever an AN signaling connection is established between the UE and the AN, the UE enters the CM-CONNECTED state. Alternatively, the transmission of an initial NAS message (Registration Request, Service Request or Deregistration Request) starts to shift from the CM-IDLE state to the CM-CONNECTED state.

In the CM-IDLE state, if the UE is not in the MICO mode, when the AMF has signaling or the mobile-terminated data to be transmitted to the UE, it performs a network-triggered service request procedure by transmitting a paging request to the corresponding UE. Whenever an N2 connection for a corresponding UE between the AN and the AMF is established, the AMF enters the CM-CONNECTED state.

The UE in the CM-CONNECTED state has an NAS signaling connection with the AMF through N1.

In the CM-CONNECTED state, whenever the AN signaling connection is released, the UE enters the CM-IDLE state.

In the CM-CONNECTED state, whenever an N2 signaling connection and N3 connection for the UE are released, the AMF enters the CM-IDLE state.

When an NAS signaling procedure is completed, the AMF may determine to release the NAS signaling connection of the UE. When the AN signaling connection release is completed, the CM state within the UE changes to the CM-IDLE. When an N2 context release procedure is completed, the CM state for the UE within the AMF changes to the CM-IDLE.

The AMF may maintain the UE in the CM-CONNECTED state until the UE is deregistered from a core network.

The UE in the CM-CONNECTED state may be an RRC Inactive state.

When the UE is in the RRC Inactive state, UE reachability is managed by an RAN using assistant information from a core network. Furthermore, when the UE is in the RRC Inactive state, UE paging is managed by the RAN. Furthermore, when the UE is in the RRC Inactive state, the UE monitors paging using the CN and RAN ID of the UE.

The RRC Inactive state is applied to an NG-RAN (i.e., applied to an NR and E-UTRA connected to 5G CN).

The AMF provides assistant information to the NG-RAN in order to assist the determination of the NG-RAN regarding whether the UE will be changed to the RRC Inactive state based on a network configuration.

The RRC Inactive assistant information includes a UE-specific discontinuous reception (DRX) value for RAN paging during the RRC Inactive state and a registration area provided to the UE.

CN assistant information is provided to a serving NG RAN node during N2 activation (i.e., registration, a service request or path switch).

The state of an N2 and the N3 reference point is not changed by the UE that enters the CM-CONNECTED state accompanied by RRC Inactive. The UE in the RRC Inactive state is aware of an RAN notification area.

When the UE is the CM-CONNECTED state accompanied by RRC Inactive, the UE may resume an RRC connection due to uplink data pending, a mobile-initiated signaling procedure (i.e., periodical registration update), a response to RAN paging, or when the UE notifies a network that it has deviated from the RAN notification area.

When the connection of the UE in a different NG-RAN node within the same PLMN resumes, UE AS context is recovered from an old NG RAN node, and the procedure is triggered toward a CN.

When the UE is in the CM-CONNECTED state accompanied by RRC Inactive, the UE performs cell selection on a GERAN/UTRAN/EPS and complies with an idle mode procedure.

Furthermore, the UE in the CM-CONNECTED state accompanied by RRC Inactive enters the CM-IDLE mode and complies with an NAS procedure related to the following cases.

If an RRC resumption procedure fails,

If a movement to the CM-IDLE mode of the UE is required within a failure scenario that cannot be solved in the RRC Inactive mode.

The NAS signaling connection management includes a function for establishing and releasing an NAS signaling connection.

The NAS signaling connection establishment function is provided by the UE and the AMF in order to establish the NAS signaling connection of the UE in the CM-IDLE state.

When the UE in the CM-IDLE state needs to transmit an NAS message, the UE initiates a service request or registration procedure in order to establish a signaling connection to the AMF.

The AMF may maintain the NAS signaling connection until the UE is deregistered from a network based on the preference of the UE, UE subscription information, a UE mobility pattern and a network configuration.

The procedure of releasing the NAS signaling connection is initiated by a 5G (R)AN node or the AMF.

When the UE detects the release of an AN signaling connection, the UE determines that the NAS signaling connection has been released. When the AMF detects that N2 context has been released, the AMF determines that the NAS signaling connection has been released.

3) UE Mobility Restriction

A mobility restriction restricts the service access or mobility control of a UE within a 5G system. A mobility restriction function is provided by a UE, an RAN and a core network.

The mobility restriction is applied to only 3GPP access, but is not applied to non-3GPP access.

In the CM-IDLE state and the CM-CONNECTED state accompanied by RRC Inactive, a mobility restriction is performed by a UE based on information received from a core network. In the CM-CONNECTED state, a mobility restriction is performed by an RAN and a core network.

In the CM-CONNECTED state, a core network provides a handover restriction list for a mobility restriction to an RAN.

The mobility restriction includes an RAT restriction, a forbidden area and a service area restriction as follows:

RAT restriction: the RAT restriction is defined as a 3GPP RAT(s) whose access of a UE is not permitted. A UE within a restricted RAT is not allowed to initiate any communication with a network based on subscription information.

Forbidden area: a UE is not allowed to initiate any communication with a network based on subscription information within a forbidden area under a specific RAT.

Service area restriction: it defines an area in which a UE can initiate cannot initiate communication with a network as follows:

Allowed area: if a UE is allowed by subscription information within an allowed area under a specific RAT, the UE is allowed to initiate communication with a network.

Non-allowed area: a service area for a UE is restricted based on subscription information within a non-allowed area under a specific RAT. The UE and the network are not allowed to initiate session management signaling for obtaining a service request or user service (both the CM-IDLE state and the CM-CONNECTED state). The RM procedure of the UE is the same as that in the allowed area. A UE within a non-allowed area responds to the paging of a core network as a service request.

In a specific UE, a core network determines a service area restriction based on UE subscription information. Optionally, an allowed area may be fine-tuned by a PCF (e.g., based on a UE location, a permanent equipment identifier (PEI) or a network policy). The service area restriction may be changed due to subscription information, a location, a PEI and/or a policy change, for example. The service area restriction may be updated during a registration procedure.

If a UE has an RAT restriction, a forbidden area, an allowed area, a non-allowed area or an area overlapping between them, the UE performs an operation according to the following priority:

The evaluation of the RAT restriction has precedence over the evaluation of any other mobility restriction;

The evaluation of the forbidden area has precedence over the evaluation of the allowed area and the non-allowed area; and The evaluation of the non-allowed area has precedence over the evaluation of the allowed area.

4) Mobile Initiated Connection Only (MICO) Mode

A UE may indicate the preference of the MICO mode during initial registration or registration update. The AMF determines whether the MICO mode is permitted for the UE based on a local configuration, the preference indicated by the UE, UE subscription information and a network policy or a combination of them, and notifies the UE of the results during a registration procedure.

A UE and a core network re-initiates or exits from the MICO mode in the following registration signaling. If the MICO mode is not clearly indicated within a registration procedure and a registration procedure is successfully completed, the UE and the AMF do not use the MICO mode. That is, the UE operates as a general UE, and the network also treats a corresponding UE as a general UE.

The AMF allocates a registration area to a UE during a registration procedure. When the AMF indicates the MICO mode for the UE, the registration area is not restricted as a paging area size. If the AMF serving area is the whole PLMN, the AMF may provide the UE with the "whole PLMN" registration area. In this case, re-registration with the same PLMN attributable to mobility is not applied. If a mobility restriction is applied to a UE in the MICO mode, the AMF allocates an allowed area/non-allowed area to the UE.

When the AMF indicates the MICO mode for the UE, the AMF considers that the UE is always unreachable during the CM-IDLE state. The AMF rejects any request for downlink data transfer for a corresponding UE that is in the MICO mode and the CM-IDLE state. The AMF also delays downlink transport, such as SMS or location service through the NAS. A UE in the MICO mode may be reachable for mobile-terminated data or signaling only when the UE is in the CM-CONNECTED mode.

The AMF may provide an RAN node with pending data indication when a UE in the MICO mode can immediately transport mobile-terminated data and/or signaling when the UE switches to the CM-CONNECTED mode. When the RAN node receives the indication, the RAN node considers the information when it determines user inactivity.

A UE in the MICO mode does not need to listen to paging during the CM-IDLE state. The UE in the MICO mode may stop any AS procedure within the CM-IDLE state until it starts switching from the CM-IDLE to the CM-CONNECTED mode due to one of the following reasons.

If a change (e.g., configuration change) within the UE requires registration update to a network If a periodic registration timer expires If MO data is pending If MO (Mobile Originating) signaling is pending Quality of Service (QoS) Model QoS is a technology for the smooth transfer service of various traffic (mail, data transmission, audio and video) to a user depending on each character.

A 5G QoS model supports a framework-based QoS flow. The 5G QoS model supports both a QoS flow that requires a guaranteed flow bit rate (GFBR) and a QoS flow that does not require the GFBR.

The QoS flow is the finest granularity for QoS classification in a PDU session.

A QoS flow ID (QFI) is used to identify a QoS flow within a 5G system. The QFI is unique within a PDU session. User plane traffic having the same QFI within a PDU session receives the same traffic transfer processing (e.g., scheduling and an admission threshold). The QFI is transferred within an encapsulation header on N3 (and N9). The QFI may be applied to a different payload type of a PDU (i.e., an IP packet, unstructured packet and Ethernet frame).

In this specification, for convenience of description, "QoS" and a "QoS flow" are interchangeably used. Accordingly, in this specification, "QoS" may be construed as meaning a "QoS flow", and "QoS" may be construed as meaning a "QoS flow."

Within a 5G system, QoS flows may be controlled by an SMF upon PDU session setup or QoS flow establishment/modification.

If applicable, all of QoS flows have the following characteristics:

QoS profile previously configured in the AN or provided from the SMF to the AN via the AMF through the N2 reference point;

One or more networks provided from the SMF to the UE via the AMF through the N1 reference point—provided QoS rule(s) and/or one or more UE-derived QoS rule(s)

SDF classification provided from the SMF to the UPF through the N4 reference point and QoS-related information (e.g., session-aggregate maximum bit rate (AMBR)).

The QoS flow may become a "guaranteed bit rate (GBR)" or a "non-guaranteed bit rate (non-GBR)" depending on the QoS profile. The QoS profile of the QoS flow includes the following QoS parameters:

i) With respect to each of QoS flows, QoS parameters may include the followings:

5G QoS indicator (5QI): the 5QI is a scalar for referring to 5G QoS characteristics (i.e., control QoS transfer handling access node-specific parameters for a QoS flow, for example, scheduling weight, an admission threshold, a queue management threshold and a link layer protocol configuration).

Allocation and retention priority (APR): the ARP includes a priority level, a pre-emption capability and pre-emption vulnerability. The priority level defines the relative importance of a resource request. This is used to determine whether a new QoS flow will be accepted or rejected if resources are restricted and to used to determine whether the existing QoS flow will pre-empt resources while the resources are restricted.

ii) Furthermore, only in the case of each GBR QoS flow, QoS parameters may further include the followings:

GFBR—the uplink and downlink;
Maximum flow bit rate (MFBR)—the uplink and downlink; and
Notification control.

iii) Only in the case of a non-GBR QoS flow, QoS parameters may further include the following: Reflective QoS attribute (RQA)

There are supported methods of controlling the following QoS flows:

1) In the case of the non-GBR QoS flow: if a standardized 5QI or a previously configured 5QI is used, a 5QI value is used as the QFI of the QoS flow and a default ARP is previously configured in the AN;

2) In the case of the GBR QoS flow: if a standardized 5QI or a previously configured 5QI is used, a 5QI value is used as the QFI of the QoS flow. A default ARP is transmitted to the RAN when a PDU session is established. Whenever the NG-RAN is used, the user plane (UP) of the PDU session is activated;

3) In the case of the GBR and non-GBR QoS flow: an allocated QFI is used. A 5QI value may be standardized, previously configured or not standardized. The QoS profile and QFI of the QoS flow may be provided to the (R)AN through N2 when a PDU session is established or when a QoS flow is established/changed. Whenever the NG-RAN is used, the user plane (UP) of the PDU session is activated.

A UE may perform the marking and classification (i.e., the association of UL traffic for a QoS flow) of UL user plane traffic based on a QoS rule. Such rules may be explicitly provided to the UE (when a PDU session is established or a QoS flow is established) or may have been previously configured in the UE or may be implicitly derived by the UE by applying reflective QoS.

The QoS rule may include a unique QoS rule ID within a PDU session, the QFI of an associated QoS flow, and one or more packet filters and precedence value. Additionally, with respect to an allocated QFI, the QoS rule may include QoS parameters related to a UE. One or more QoS rules associated with the same QoS flow (i.e., having the same QFI) may be present.

The default QoS rule may be necessary for all of PDU sessions. The default QoS rule may be a unique QoS rule of a PDU session that may not include a packet filter (In this case, the highest precedence value (i.e., the lowest priority) must be used). If the default QoS rule does not include a packet filter, the default QoS rule defines the processing of packets not matched with another QoS rule in a PDU session.

The SMF performs binding between SDFs for a QoS flow depending on the QoS of an SDF and service requirements. The SMF allocates a QFI to a new QoS flow, and derives the QoS parameter of the new QoS flow from information provided by the PCF. If applicable, the SMF may provide an (R)AN with a QFI along with a QoS profile. The SMF provides an SDF template (i.e., a set of packet filters associated with the SDF received from the PCF) along with SDF priority, QoS-related information and corresponding packet marking information (i.e., a QFI, a differentiated services code point (DSCP) value and optionally enables the classification, bandwidth application and marking of user plane traffic using reflective QoS indication for a UPF). If applicable, the SMF generates QoS rule(s) for a PDU session by allocating unique QoS rule IDs within a PDU session to which the QFI of a QoS flow has been added, configuring packet filter(s) for the UL part of the SDF template, and setting QoS rule priority in the SDF priority. The QoS rule is provided to a UE that enables the classification and marking of UL user plane traffic.

FIG. 12 illustrates classification and user plane marking for a QoS flow and the mapping of a QoS flow to AN resources according to an embodiment of the present invention.

1) Downlink

An SMF allocates a QFI for each QoS flow. Furthermore, the SMF derives QoS parameters from information provided by a PCF.

The SMF provides an (R)AN with the QFI along with a QoS profile including the QoS parameters of a QoS flow. Furthermore, when a PDU session or QoS flow is established, the QoS parameters of the QoS flow is provided to the (R)AN as the QoS profile through N2. Furthermore, whenever an NG-RAN is used, a user plane is activated. Furthermore, QoS parameters may be previously configured in the (R)AN for a non-GBR QoS flow.

Furthermore, the SMF provides an UPF with an SDF template (i.e., a set of packet filters associated with the SDF received from the PCF) along with SDF preference and a corresponding QFI so that the UPF can perform the classification and marking of a downlink user plane packet.

Downlink inflow data packets are classified based on the SDF template according to the SDF preference (without the initiation of additional N4 signaling). A CN classifies user plane traffic belonging to a QoS flow through N3 (and N9) user plane marking using the QFI. The AN binds the QoS flow with AN resources (i.e., a DRB in the case of the 3GPP RAN). In this case, a relation between the QoS flow and the AN resources is not restricted to 1:1. The AN may configure the AN resources necessary to map a QoS flow to a DRB so that a UE may receive the QFI (and reflective QoS may be applied).

If matching is not discovered, when all of QoS flows are related to one or more DL packet filters, the UPF may discard a DL data packet.

Characteristics applied to process downlink traffic are as follows:

The UPF maps user plane traffic to the QoS flow based on the SDF template.

The UPF performs session-AMBR execution and performs PDU counting for charging support.

The UPF may transmit the PDUs of a PDU session in a single tunnel between 5GC and the (A)AN, and the UPF may include the QFI in an encapsulation header.

The UPF performs transmission level packet marking in the downlink (e.g., sets DiffServ code in an outer IP header). Transmission level packet marking is based on 5QI and the ARP of an associated QoS flow.

The (R)AN maps PDUs from a QoS flow to access-specific resources based on a QFI, related 5G QoS characteristics and parameters by considering an N3 tunnel associated with a downlink packet.

If reflective QoS is applied, a UE may generate a new derived QoS rule (or may be called a "UE-derived QoS rule"). A packet filter within the derived QoS rule may be derived from a DL packet (i.e., the header of the DL packet). The QFI of the derived QoS rule may be configured depending on the QFI of the DL packet.

2) Uplink

The SMF generates QoS rule(s) for a PDU session by allocating a QoS rule ID, adding the QFI of a QoS flow, setting packet filter(s) in the uplink part of an SDF template, and setting QoS rule precedence in SDF precedence. The SMF may provide a UE with the QoS rules in order for the UE to perform classification and marking.

The QoS rule includes a QoS rule ID, the QFI of a QoS flow, one or more packet filters and preference values. The same QFI (i.e., the same QoS flow) and one or more QoS rules may be associated.

A default QoS rule is required for each PDU session. The default QoS rule is the QoS rule of a PDU session not including a packet filter (In this case, the highest precedence value (i.e., the lowest priority) is used). If the default QoS rule does not include a packet filter, the default QoS rule defines the processing of a packet not matched with any another QoS rule within the PDU session.

The UE performs the classification and marking of uplink user plane traffic. That is, the UE associates uplink traffic with the QoS flow based on the QoS rule. The rule may be explicitly signaled through N1 (when a PDU session is established or when a QoS flow is established or may be previously configured in the UE or may be implicitly derived by the UE from reflected QoS.

In the UL, the UE evaluates an UL packet with respect to the packet filter of the QoS rule based on the precedence value of the QoS rule (i.e., in order of increasing precedence value) until a matching QoS rule (i.e., the packet filter is matched with the UL packet) is discovered. The UE binds the UL packet to the QoS flow using a QFI in the corresponding matching QoS rule. The UE binds the QoS flow and the AN resources.

If matching is not discovered and a default QoS rule includes one or more UL packet filters, the UE may discard an UL data packet.

Characteristics applied to process uplink traffic are as follows:

- A UE may use stored QoS rules in order to determine mapping between UL user plane traffic and a QoS flow. The UE may mark an UL PDU with the QFI of a QoS rule including a matching packet filter, and may transmit the UL PDU using corresponding access-specific resources for a QoS flow based on mapping provided by an RAN.
- The (R)AN transmits the PDU through an N3 tunnel with respect to an UPF. When an UL packet passes through a CN from the (R)AN, the (R)AN includes a QFI in the encapsulation header of the UL PDU and selects the N3 tunnel.
- The (R)AN may perform transmission level packet marking in the uplink. The transmission level packet marking may be based on the ARP of a QoS flow associated with a 5QI.
- A UPF checks whether the QFIs of UL PDUs are provided to the UE or are aligned (e.g., in the case of reflective QoS) with QoS rules implicitly derived by the UE.
- The UPF performs session-AMBF execution and counts a packet for charging.

In the case of an UL classifier PDU session, UL and DL session-AMBRs need to be performed on an UPF that supports an UL classifier function. Furthermore, the DL session-AMBR needs to be separately performed in all of UPFs that terminate an N6 interface (i.e., an interaction between UPFs is not required).

In the case of a multi-home PDU session, UL and DL session-AMBRs are applied to an UPF that supports a branch point function. Furthermore, the DL session-AMBR needs to be separately performed in all of UPFs that terminate the N6 interface (i.e., an interaction between UPFs is not required).

The (R)AN needs to perform a maximum bit rate (UE-AMBR) restriction in the UL and DL for each non-GBR QoS flow. When the UE receives a session-AMBR, it needs to perform a PDU session-based UL rate restriction for non-GBR traffic using the session-AMBR. The rate restriction execution for each PDU session is applied to a flow that does not require a guaranteed flow bit rate. The MBR per SDF is mandatory to a GBR QoS flow, but is optional for a non-GBR QoS flow. The MBR is performed in the UPF.

QoS control for an unstructured PDU is performed in a PDU session level. When the PDU session is established for the transmission of the unstructured PDU, the SMF provides the UPF and the UE with a QFI to be applied to any packet of the PDU session.

Detach Procedure

FIG. 13 illustrates a UE-initiated detach procedure in an E-UTRAN that may be applied to the present invention.

In particular, in FIG. 13, a case is assumed in which the UE is camping on the E-UTRAN and a detach request is transmitted to the MME. TS 23.401 may be merged with the present specification in connection with the embodiment.

1. First, the UE may transmit to the MME a NAS message (globally unique temporary identifier (GUTI), including switch-off) for requesting the detach. The NAS message is used to trigger the establishment of the S1 connection when the UE is in an ECM-IDLE mode. The switch-off indicates whether the detach is made due to a switch-off situation of the UE. The eNodeB transmits the NAS message to the MME together with the TAI and E-UTRAN cell global identifier (ECGI) of the cell used by the UE.

When the MME receives the detach request via a CSG cell with a switch-off parameter indicating that the detach request is not made due to the switch-off situation, and the CSG ID and the CSG subscription to the associated PLMN are missing or expired, the MME may trigger the MME-initiated detach procedure. When the NAS message is used to establish the S1 connection, a security procedure may be invoked. In the case of an emergency attached UE which is not successfully authenticated, the security procedure is not performed.

2. When the UE does not have an activated PDN connection, steps 2 to 10 are not executed. For any PDN connection to the SCEF, the MME indicates to the SCEF that the PDN connection to the UE is no longer valid according to TS 23.682 [74], and steps 2 to 10 are not executed. For the PDN connection to the P-GW, the active EPS bearer of the serving GW for the specific UE is cancelled by a session deletion request (linked EPS bearer identity (LBI)) and user location information (ECGI) transmitted by the MME every PDN connection to the serving GW. When idle state signaling reduction (ISR) is activated, the serving GW should not release the control plane (tunneling end ID (TEID)) allocated to the MME/SGSN until the session deletion request message is received in step 5. When a UE time zone is changed, the MME includes a UE time zone information element (IE) in the message.

3. When the serving GW (S-GW) receives an initial session deletion request message from the MME or SGSN in an ISR activated state, the serving GW deactivates the ISR, releases the associated EPS bearer context information, and responds to a session deletion response (cause). When the S-GW receives the session deletion request message from the MME or SGSN in the ISR deactivated state, the serving GW releases the associated EPS bearer context information and transmits the session deletion request message (LBI) for each PDN connection to the PDN GW to immediately enter step 6. After step 7, the serving GW responds to the MME/SGSN with the session deletion response message (cause) again.

4. When the ISR is activated, the MME may transmit a detach indication message (cause) to the associated SGSN. The cause indicates complete detach.

5. The activated power delay profile (PDP) context in the serving GW for the specific UE is deactivated by the SGSN transmitting the session deletion request (LBI and CGI/SAI) for each PDN connection to the serving GW. When the UE time zone is changed, the SGSN includes the UE time zone IE in the message.

6. When the ISR is activated, the serving GW deactivates the ISR. When the ISR is not activated in the serving GW, the serving GW transmits the session deletion request (LBI and user location information (ECGI or CGI/SAI)) for each PDN connection to the PDN GW. When the ISR is not activated, the step is triggered by step 2. The message indicates that all bearers belonging to the PDN connection should be released. When the MME and/or the SGSN transmits location information and/or the UE time zone information of the UE in step 2 and/or step 5, the S-GW makes the user location information, the UE time zone, and/or user CSG information with the least age be included in the message.

7. The PDN GW performs an acknowledge for the session deletion response (cause).

8. The PDN GW uses a policy and charging enforcement function (PCEF)-initiated connectivity access network (CAN) session termination procedure defined in TS 23.203 [6] together with a policy and charging rules function (PCRF) to inform the PCRF that the EPS is released when the PCRF is applied in the network. When requested by the PCRF, the PDN GW instructs the PCRF to provide the user location information and/or UE time zone information as defined in TS 23.203 [6].

9. The serving GW performs the acknowledge for the session deletion response (cause).

10. The SGSN may transmit a Detach Acknowledge message to the MME.

11. When the switch-off indicates that the detach is not made due to the switch-off situation, the MME transmits a detach accept to the UE.

12. The MME transmits an S1 release command to set the detach as the cause to the eNodeB to release an S1-MME signaling connection. The details of the step follow the "S1 Release Procedure" described in Section 5.3.5 of TS 23.401.

FIG. 14 illustrates a UE-initiated detach procedure in a GERAN/UTRAN in which an ISR that may be applied to the present invention is activated.

In particular, in FIG. 14, a case is assumed in which the UE in which the ISR is activated is camping on the GERAN/UTRAN and the detach request is transmitted to the SGSN. TS 23.401 may be merged with the present specification in connection with the embodiment. When the ISR is not activated, the UE-initiated detach procedure may follow Section 6.6.1 of TS 23.060 [7].

1. First, the UE may transmit the detach request (detach type, packet (P)-temporary mobile subscriber identity (TMSI), P-TMSI signature, and switch-off) which is the NAS message. The detach type indicates which type of detach needs to be performed, i.e., GPRS only detach, IMSI only detach, or combined GPRS and IMSI detach. The switch-off indicates whether the detach is made due to the switch-off situation. The detach request message includes P-TMSI and P-TMSI signatures. The P-TMSI signature is used to check a validity of the detach request message. When the P-TMSI signature is not valid or not included, an authentication procedure needs to be performed.

When the SGSN receives the detach request through a switch-off parameter indicating that the detach is not made due to the switch-off situation and the CSG ID and the CSG subscription information for the associated PLMN are missing or expired, the SGSN triggers the SGSN-initiated detach procedure of Section TS 23.401 5.3.8.3A.

2. The activated EPS bearers in the serving GW for the specific UE is deactivated by the SGSN transmitting the session deletion request (LBI and user location information (CGI/SAI)) for each PDN connection to the serving GW. When the ISR is activated, the serving GW should not release the control plane TEID allocated to the MME/SGSN until the session deletion request message is received in step 5. When the UE time zone is changed, the SGSN includes the UE time zone IE in the message.

3. Since the serving GW receives the message in the ISR activated state, the serving GW deactivates the ISR and responds with the session deletion response (reason).

4. Since the ISR is activated, the SGSN sends a detach release notification (cause) message to the associated MME. The cause indicates the complete detach.

5. The activated PDP context in the serving GW for the specific UE is deactivated by the SGSN transmitting the session deletion request (LBI and ECGI) for each PDN connection to the serving GW. When the UE time zone is changed, the MME includes the UE time zone IE in the message.

6. The serving GW deactivates the ISR and transmits the session deletion request (LBI and user location information (ECGI or CGI/SAI)) for each PDN connection to the PDN GW. When the ISR is not activated, the step is triggered by step 2. The message indicates that all bearers belonging to the PDN connection should be released. When the MME and/or the SGSN transmits location information and/or the UE time zone information of the UE in step 2 and/or step 5, the S-GW makes the user location information and/or UE time zone with the least age be included in the message.

7. The PDN GW acknowledges for the session deletion response (cause).

8. The PDN GW uses the PCEF-initiated IP CAN session termination procedure defined in TS 23.203[6] with the PCRF to inform the PCRF that the EPS bearer is terminated when the PCRF is applied to the network. When requested by the PCRF, the PDN GW instructs the PCRF to provide the user location information and/or UE time zone information as defined in TS 23.203[6].

9. The serving GW acknowledges for the session deletion response (cause).

10. The MME sends a detach acknowledge message to the SGSN.

11. When the switch-off indicates that the detach is not made due to the switch-off situation, the SGSN transmits the detach accept to the UE.

12. When the MS is GPRS-detached, the 3G SGSN releases the PS signaling connection.

Hereinafter, the detach procedure disclosed in TS 23.402 will be described.

Hereinafter, the detach procedure described below is initiated by a UE or an evolved packet data gateway (ePDG)-initiated detach procedure and when Proxy Mobile IPv6 (PMIPv6) is used on the S2b interface, the detach procedure may be applied to a UE-requested PDN disconnection procedure.

The UE may initiate the detach procedure, for example, when the UE is powered off. The ePDG needs to initiate the detach procedure for reasons of administration or IKEv2 tunnel release. The detach procedure initiation of the ePDG may be implemented based on a local operator policy.

In the case of multiple PDN connections, the detach procedure needs to be repeated for each connected PDN.

FIG. 15 illustrates a UE/ePDG-initiated detach procedure having PMIPv6 on S2b that may be applied to the present invention.

TS 23.402 may be aggregated with the present specification in connection with the embodiment.

In the figure, home routed roaming, local break out (LBO), and non-roaming scenarios are illustrated. In the case of the LBO, the 3GPP AAA proxy serves as an intermediary to transfer the message from the 3GPP AAA server of the HPLMN to the PDN GW of the visited PLMN (VPLMN) or vice versa. The message between the PDN GW of the VPLMN and the hPCRF of the HPLMN is transferred by the visited PCRF (vPCRF) of the VPLMN. In the case of the non-roaming, the vPCRF and the 3GPP AAA proxy are not relevant.

When dynamic policy provisioning is not deployed, step 4 which is an optional step is not performed. Instead, the PDN GW may adopt a static configured policy.

1. IKEv2 tunnel release triggers PMIP tunnel release.

2. The mobility access gateway (MAG) of the ePDG needs to send a proxy binding update (MN network access identifier (NAI), APN, lifetime=0) message to the PDN GW. When the MAG of the ePDG needs to send the proxy binding update message to the PDN GW, the case may vary depending on the local operator policy. The MN NAI identifies the UE. When only one PDN connection is allowed with a given APN, a predetermined PDN GW may support multiple PDNs, and as a result, the APN is needed to determine which PDN is to deregister the UE. When multiple PDN connections to the given APN are supported, APN and PDN connection identifiers are needed to determine which PDN is to deregister the UE. When the lifetime value is set to 0, the set lifetime indicates PMIP deregistration.

3. The PDN GW informs the 3GPP AAA server of the PDN disconnection. In a case where the UE no longer has a context in the 3GPP AAA server, the 3GPP AAA server informs the HSS of the case where the UE no longer has the context in the 3GPP AAA server as described in Section 12.1.2.

4. The PDN GW deletes the IP CAN session associated with the UE and executes the PCEF-initiated IP-CAN session termination procedure with the PCRF as specified in TS 23.203[19].

5. The PDN GW deletes all existing entries for the indicated home address (HoA) from the binding cache and transmits a proxy binding Ack (MN NAI, Lifetime=0) message to the MAG of the ePDG. The PDN GW transmits the proxy binding Ack message to the ePDG. The MN NAI value and the Lifetime=0 value indicate that the UE is successfully deregistered.

6. A non-3GPP specific resource release procedure is executed.

FIG. 16 illustrates a UE/trusted WLAN access networks (TWAN)-initiated detach procedure and a UE/TWAN-Request PDN disconnection procedure on GPT S2a that may be applied to the present invention.

TS 23.402 may be aggregated with the present specification in connection with the embodiment.

Such a procedure applies to a transparent single-connection mode. Such a procedure is applied even to a single-connection mode except for step 1.

Such a procedure is applied to s to non-roaming, home routed roaming, and local breakout cases. In the case of the local breakout, the vPCRF forwards the message between the PDN GW and the hPCRF. In the case of the home routed roaming and the LBO, the 3GPP AAA proxy serves as the intermediary between the trustable non-3GPP IP access of the HPLMN and the 3GPP AAA server. In the case of the non-roaming and home routed roaming, the vPCRF does not intervene at all.

When the dynamic policy provisioning is not deployed, optional steps of interaction between the PDN GW and the PCRF are not performed. Instead, the PDN GW may adopt the static configured policy.

1. In order to detach from the EPC, the UE may send a disassociation or deauthentication notification in accordance with IEEE Std 802.11-2012[64]. When the PDN type is IPv4 at any time after the UE releases the IPv4 address due to expiration of the DHCPv4 or IPv4 address lease time, the TWAN initiates a "TWAN-initiated PDN disconnection procedure". When there is no traffic received from the UE for a configurable duration and the TWAN detects that the UE leaves based on an unanswered probe (e.g., an ARP request and a neighbor solicitation message), the TWAN triggers a PDN disconnection.

2. The TWAN transmits a session deletion request (linked EPS bearer ID and TWAN release cause (if possible)) message for the PDN connection to the PDN GW to release the PDN connection. In addition, the session deletion request includes a TWAN identifier, a time stamp of the TWAN identifier, and a UE time zone. The TWAN release cause is transmitted from the TWAN to the PDN GW only when allowed by a policy of a WAN operator.

3. The PDN GW informs the 3GPP AAA server of the PDN disconnection. In the case where the UE no longer has the context in the 3GPP AAA server, the 3GPP AAA server informs the HSS of the case where the UE no longer has the context in the 3GPP AAA server.

4. The PDN GW deletes the IP CAN session associated with the UE and executes the PCEF-initiated IP-CAN session termination procedure with the PCRF. When received from the TWAN, the PDN GW also needs to provide the TWAN release cause as well as the user location information including the TWAN identifier and/or the UE time zone (if possible) and the PCRF needs to transfer the user location information and the TWAN release cause by an application function defined in TS 23.203[19].

5. The PDN GW acknowledges for the session deletion response (cause).

6. The TWAN locally removes the UE context and deauthenticates and disassociates the UE in layer 2 according to IEEE Std. 802.11-2012[64].

L2 disassociation provides the UE with an indication that the previous IPv4 address/IPv6 prefix may no longer be valid. Next, when the UE is connected to the network, the UE proceeds with reacknowledgement or reacquisition of the IPv4 address/IPv6 prefix.

As described in the embodiment of FIGS. 13 to 16 below, the MME administrates the 3GPP connection in the EPC and administrates the non-3GPP connection EPC is managed by the MME for the 3GPP connection and TWAN/ePDG/AAA or the like administrates the non-3GPP connection according to an interface to which the UE is connected. Therefore, the UE in the related art needs to independently perform detach (also referred to as "deregistration" or "disconnection") for each connection. In particular, in the EPC, the MME did not participate in the operation of the UE connected by the non-3GPP connection.

However, in the 5G system, it is possible to administrate the 3GPP/non-3GPP through one AMF, so that it is possible to release all connections through one detach without performing the detach for each connection. Therefore, in the following description, a specific embodiment for releasing both the 3GPP and non-3GPP connections through one detach is proposed.

1) Method #1: UE-Initiated Detach/Deregistration Procedure

FIG. 17 illustrates a UE-initiated detach procedure according to a first embodiment of the present invention. In particular, FIG. 17 illustrates a procedure for performing the detach through the 3GPP access in a situation where the UE accesses the network through the 3GPP and non-3GPP accesses. However, the present invention is not limited thereto and the present embodiment may be applied in the same or similar manner even to the procedure for performing the detach through the non-3GPP access.

1. First, the UE may transmit a detach request NAS message (hereinafter, abbreviated as 'detach request' or 'detach request message') for requesting the network node/entity to detach. More specifically, the UE may transmit the detach request message to the AMF and the detach request message in this case may include temporary identifier information/value allocated from the AMF, access information (may be referred to even as 'access type information') regarding requested to be detached/desired, and/or a switch-off indication. The switch-off indication corresponds to an indicator indicating whether the detach request of the UE is made by switch-off of the UE. When the detach request of the UE is made by the switch-off of the UE, such a switch-off indication is included in the detach request message and if not, such a switch-off indication is not included in the detach request message.

When the UE desires to be detached from the 3GPP access, the UE does not particularly need to transmit the detach request message through the 3GPP access. That is, even if the UE desires to be detached from the 3GPP access, the UE may transmit the detach request message through the non-3GPP access. Similarly even when the UE desires to be detached from the non-3GPP access, the UE may transmit the detach request message via the non-3GPP access or the 3GPP access.

In this case, the UE may explicitly/implicitly indicate to the network the access desired to be detached in various embodiments.

When the UE informs the network of the access to be explicitly requested to be detached, the UE may generate/signal and transmit to the network 'access information' indicating the access desired to be detached in various embodiments. For example, when the UE desires to be detached from both the 3GPP access and the non-3GPP access, the UE may generate/configure/signal the access information to indicate the both accesses, 'all accesses', or 'detach over/from any access' and transmit the generated/configured/signaled access information to the network. Alternatively, the UE may request the network to be detached from all accesses to which the UE is attached by transmitting any connection information not to be included in the detach request message.

When the UE informs the network of the access to be implicitly requested to be detached, the UE may implicitly information the network of the detach request access by transmitting the detach message through the accessed desired to be detached. In this case, the network may determine that the access for which the detach request message is transmitted indicates the access from which the UE desires to be detached.

Hereinafter, for easy description, an embodiment will be primarily described in which the UE explicitly indicates the access from which the UE desires to be detached to the network through the access information.

2-3. The network node (i.e., AMF1) determines from which access the UE needs to be detached through the access information included in the detach request message transmitted by the UE. When the access information is not received according to the above-described embodiment, the AMF1 may regard the access for which the detach request message is transmitted as the access from which the UE desires to detached or regard all accesses to which the UE is attached as the access from which the UE desires to be detached.

When the UE transmits the switch-off indicator included in the detach request message, the network (i.e., AMF1) may perform the detach from all accesses regardless of the access information transmitted by the UE (even though the access information is not transmitted). However, the present invention is not limited thereto and the network may regard only the access indicated by the access information as the access requested to be detached due to the switch-off of the UE. The switch-off indication of the UE in this case does not mean power-off of the UE, but means off (for example, when 3GPP data use is turned off or Wi-Fi is turned off) for the access.

The AMF1 transmits an update location request message (or abbreviated as 'location update request') to the UDM and transmits the corresponding message including the IMSI of the UE, the detach indication indicating that the UE needs to be detached, and/or information on the access to be detached when the AMF1 determines that another access than the access administrated by the AMF1 needs to be detached according to the detach request of the UE. Additionally, the AMF1 may transmit a reason why the UE requests the detach, for example, a case where the AMF1 receives the switch-off indication form the UE, which is included in the update request message. The location update request message consequently corresponds to a message for informing the UDM that an access not administrated/served/involved by the AMF1 needs to be detached and a message name is not limited to the example and may be referred to as various names if the messages perform the same function.

When the UE is to be detached only from the accesses administrated by the AMF1, the exchange of the message with the corresponding UDM in steps 2 and 3 may be omitted.

When all accesses (whether one access or multiple accesses) from the AMF1 needs to be detached are the accesses administrated/served/involved by the AMF1, the AMF may perform an operation of detaching from all accesses without requesting the detach from the access not administrated/served/involved by the AMF1 to the UDM (i.e., perform steps 6 to 14).

4-5. When the UDM receives from the from AMF1 a location update request message indicating that another access (i.e., the access not administrated/served/involved by the AMF1) needs to be detached, the UDM transmits a cancel location request message (or abbreviated 'cancel location request') to the AMF2 that administrates/serves/involves another access to allow the AMF2 to perform the detach from another access (i.e., target access). In this case, the cancel location request message may include access information indicating a detach target access (i.e., target access). The AMF2 that receives the cancel location request message performs the detach of the UE from the corresponding access (i.e., target access). More specifically, the AMF2 performs steps 6 to 9 described below and performs steps for detaching the access administrated/served/involved by the AMF2 (i.e., perform step 11/12 when the AMF2 administrates/serves/involves the 3GPP access and perform step 13/14 when the AMF2 administrates/serves/involves the non-3GPP access (however, does not perform step 10).

Therefore, it becomes possible to detach the second access (non-3GPP access or 3GPP access) different from the first access through the first access (3GPP access or non-3GPP access). For example, when the UE is connected with the 3GPP via the V-AMF of the VPLMN and is connected with the non-3GPP via the H-N3IWK of the HPMN, the UE may perform the detach from the non-3GPP by transmitting the detach request through the 3GPP access while escaping from a range (wireless local area network (WLAN) coverage) of the non-3GPP access. Similarly, the detach of the 3GPP access may also be performed through the non-3GPP access.

6. When the AMF1 needs to perform the detach of the UE from the access administrated/involved/served by the AMF1, the AMF1 transmits a detach indication message (or abbreviated as 'detach indication') to all SMFs administrating the session of the UE to release the session of (all existing) UEs. In this case, the detach indication message may include the IMSI of the UE that requests the detach.

7-9. The SMF transmits a delete tunnel request message for delete the tunnel to all UPFs allocated for the session to delete the contexts for all sessions. In this case, the delete request message may include a PDU ID for identifying a PDU as a delete request target. After deleting all session contexts, the SMF transmits a detach indication acknowledgment (ack) to the AMF to inform that all sessions are released.

When the PDU session generated through the target access does not exist, i.e., the UE is just attached without the PDU session, a process of releasing the session (e.g., steps 6 to 9) may be omitted.

10. In this case, the AMF1 which receives the detach indication ack from all the SMFs managing the session of the UE may transmit a detach accept message (or abbreviated as 'detach accept') for informing that the detach is accepted to the UE. In this case, the AMF1 may information the UE of the access information regarding from which access is detached via the detach accept message. When the UE receives the detach accept message without the access information regarding from which access the UE is detached, the UE may recognize/regard that all accesses from which the UE requests to be detached are detached. The detach accept message may include a temporary (Temp) ID allocated to the UE.

When the UE transmits the switch-off indication included in the detach request message in step 1, the step of transmitting the detach accept message to the UE by the AMF1 may be omitted. However, when the UE requests the detach from the second access (e.g., non-3GPP access or 3GPP access) and makes the switch-off indication be included in the detach request message while transmitting the detach request message through the first access (e.g., 3GPP access or non-3GPP access), the AMF1 may transmit the detach accept message to the UE via the first access. That is, the AMF1 may determine whether to transmit the detach accept message to the UE according to the type/cause (for example, whether the switch-off is made) of the detach of the UE.

11-14. The AMF1 may transmit an NG2 release request message in order to release an NG2 interface of the access from which the UE is detached. More specifically, when the 3GPP is detached, the AMF1 transmits the NG2 release request message to the RAN when the 3GPP is detached and transmits the NG2 release request message to the N3IWK when the non-3GPP is detached to release the NG2 (interface). The temporary ID of the UE that request the detach may be included in the NG2 release request message. When the UE is to be detached from all accesses due to the switch-off or the like, the AMF1 releases the NG2 (interface) in both the 3GPP/non-3GPP. When the NG2 of the non-3GPP is released, the N3IWK also releases Internet key exchange 2 (IKEv2) tunnel (IP security (IPsec) tunnel) together. When the UE is detached from the corresponding access due to the switch-off, the IKEv2 tunnel (IPsec tunnel) may be locally released without interaction with the UE.

When, in step 2, the AMF1 determines that the detach from another access than other than the access administrated by the AMF1 is required, as mentioned in the operation of AMF2 in steps 4 and 5, the AMF1 which receives the detach request performs the NG2 release operation only for the access involved by the AMF1. The AMF2 which receives the detach request of the UE from the AMF1 also performs step 11/12 or 13/14 according to the target access to be detached.

The AMF (AMF1 or AMF2) may immediately delete the UE context stored in connection with the access in which the detach is performed together with the detach and stores the UE context for a predetermined time to reuse the stored UE context in attach/registration of the UE. The AMF (AMF1 or AMF2) may also inform the UDM that the UE is detached.

When the UE is attached/registered via both the 3GPP access and the non-3GPP access, a case where the AMFs administrating respective accesses are different from each other may representatively be a case where the PLMNs to which the respective accesses belong are different. Since there is normally no interface (NG14) between the AMFs belonging to different PLMNs, it is possible to indicate the detach to another AMF via the UDM as in the embodiment. However, when the interface exists between the AMFs administrating the respective accesses and the AMFs recognizes the existence of each other, the AMF1 receives the detach request message from the UE to directly indicate the detach from the access administrated/involved/served by the AMF2 to the AMF2.

FIG. 17 illustrates an embodiment in which the UE transmits the detach request to the network through the 3GPP access, but unlike this, the UE may transmit the detach request to the network through the non-3GPP access and even in this case, the detach may be performed based on the aforementioned operation.

2) Method #2: UE-Initiated Detach/Deregistration Procedure for Each of a Plurality of Serving AMFs In that in the case of Method #1, the detach is directly requested only one representative AMF (for example, AMF1) serving the UE, but in the case of Method #2, the UE directly requests the detach the respective AMFs, there is a difference between both methods. Other embodiments of Method #1 may be applied even to Method #2 in the same/similar manner and a duplicated description is omitted. Hereinafter, the embodiment of Method #2 will be described below, focusing on the difference from Method #1.

1. The UE is concurrently attaches/registers via the 3GPP access and the non-3GPP access, but may desire to be detached from both accesses (e.g., due to the switch-off or the like).

2. In this case, the UE may judge/recognize that the AMFs administrating the respective accesses are different from each other. That is, this may mean that the UE judges/recognizes whether the AMF administrating all accesses is one AMF or a plurality of AMFs. This may be inferred/judged by the UE through the temporary ID (temp ID) information allocated from the AMF at the time of attach/registration to/in each access by the UE. Since the temporary ID may include information such as the PLMN ID and the AMF ID, the UE may judge whether the AMs administrating the respective accesses are different from each other through the temporary ID. However, the present invention is not particularly limited thereto and the UE may infer/judge whether the AMFs administrating the accesses are identical based on the various information received from each AMF.

3. When the AMFs administrating the respective accesses are different from each other, the UE transmits the detach request message to each AMF. That is, the UE transmits the detach request message to each of the AMFs serving the UE. Otherwise (i.e., when there is only one AMF administrating all accesses), the UE may transmit the detach request message only to the AMF serving/administrating the UE. In this case, as described in step 1 of [Method #1], the UE may explicitly or implicitly inform the network of the detach request from all accesses.

4. The AMF that receives the detach request from the UE performs the detach operation (e.g., performs steps 6 to 14 of Method #1) as described above in Method #1.

3) Method #3: Network-Initiated Detach/Deregistration Procedure

1. When the UDM determines to request the detach to the AMF, the UDM may request the detach (i.e., transmit the detach request message for requesting the detach) to the AMF. In this case, the detach request transmitted to the AMF may correspond to the cancel location request. In this case, the UDM may explicitly or implicitly indicate a reason for the detach (for example, subscription withdrawn) when requesting the detach to the AMF. That is, the UDM may transmit the detach reason explicitly or implicitly included in the detach request message to the AMF.

A. Case where both 3GPP and non-3GPP accesses are served/administrated by one AMF:

2a. The UDM transmits the detach request message to the AMF. In this case, the detach request message may include the access information for the target access as the detach target and/or the detach reason (or removal reason). In this case, the access information may be signaled in various methods. For example, when the UDM desires to request the detach for all accesses, the access information may be signaled so as to indicate "3GPP access and non-3GPP access", "all accesses", or "any access" and included in the detach request message. However, the detach request message does not particularly include the access information and the AMF may judge whether to detach all accesses based on the detach reason (e.g., subscription withdrawn) even though there is no access information in the detach request message. For example, the AMF may perform the detach for all accesses when the detach reason (or removal reason) included in the received detach request message is the subscription withdrawn.

3a. The AMF may operate according to i) or ii) below.

i) The AMF may transmit the detach request message to the UE via either of two accesses (i.e., 3GPP access and non-3GPP access). In this case, the AMF may make the access information for the target access for which the detach is requested be included in the detach request message. In this case, the access information may be signaled in various methods. For example, when all accesses are the target accesses to be detached, the access information may be signaled so as to indicate "3GPP access and non-3GPP access", "all accesses", or "any access. In this case, a criterion for the AMF to select either one of the two accesses may include subscriber information of the UE, a local policy, indication information (for example, indication information for the access which the AMF is to use at the time of transmitting the detach request to the UE) which the UDM transmits to the AMF when performing step 2a, and the like.

ii) The AMF may transmit the detach request message to the UE via each of the two accesses. Even in this case, the detach request message may include or not include the access information for the target access and when the detach request message includes the access information for the target access, the access information may be signaled in various methods as described above.

B. Case where 3GPP and non-3GPP accesses are served/administrated by one AMF, respectively:

2b. The UDM may operate according to i) or ii) below.

i) The UDM transmits the detach request message to both AMFs. In this case, the detach request message may include information indicating to explicitly transmit the detach request message to the UE. Each of the AMFs that receive the information may transmit the detach request message to the UE.

ii) The UDM transmits the detach request message to each of the both AMFs. In this case, the UDM may select one AMF of the two AMFs (in this case, a selection criterion may correspond to the subscriber information, the local policy, or the like) and indicate the selected AMF to transmit to the UE the detach request message for indicating/requesting the detach for all accesses. This is to perform the detach (UE context deletion, PDU session release, access specific resource release, or the like) for the access administrated by the AMF without an interaction (this means the interaction from the viewpoint of the NAS) between the remaining AMF (that is, unselected AMF) and the UE.

To this end, the detach request message transmitted to the selected AMF may include information for indicating the UE to request the detach (or indicate to transmit the detach request message). And/or, the detach request message transmitted to the unselected AMF may include information for indicating the UE not to request the detach (or indicate not to transmit the detach request message). In this case, the information may be indicated explicitly or implicitly. The access information for the target access to be detached may be explicitly or implicitly signaled and included in the former detach request message (i.e., the detach request message transmitted to the selected AMF). For example, the access information may be signaled so as to indicate "3GPP access and non-3GPP access", "all accesses", or "any access and included in the corresponding detach request message.

In the aforementioned embodiments, it may be defined that when the UE is in an idle mode/state when releasing another access through any one access, instead of the UE being switched to a connected mode/state for the detach, the detach request is transmitted/received between the UE and the network when the UE enters the connected mode/state for the purpose of performing another operation. For example, in a case where the UE in the idle mode/state intends to detach the non-3GPP access through the 3GPP access, when the UE waits without being switched to the connected mode/state and then, is switched to the connected mode/state due to another reason (e.g., tracking area update (TAU), registration update, MO data, scheduling request (SR), or the like), the UE may transmit the detach request message to the network.

Hereinafter, the detach procedure in Methods #1 to #3 will be described below in more detail. In particular, hereinafter, proposed are a method for updating the detach procedure based on a service based architecture (SBA) method and a method for requesting the detach of all or other accesses (which may be reflected to the detach in TS 23.501). Hereinafter, the detach request may indicate whether the detach is applied to the 3GPP access or the non-3GPP access or both accesses. Hereinafter, for easy description, the above-described 'detach' will be referred to as 'deregistration' and the two terms are substantially equal in the present specification.

The deregistration procedure allows:

Informing the network that the UE no longer wants to access the 5G system; and/or Informing the UE that the 5G system may not be accessed any longer by the network.

The deregistration request by the UE and the network may include information indicating whether the deregistration is applied to the 3GPP access or the non-3GPP access, or the both accesses. When the UE is registered to both accesses of the same PLMN, the deregistration message is transmitted via any access of the both accesses regardless of the target accesses for which the deregistration is applied/indicated.

1) Modified Embodiment of Method #1: UE-Initiated Deregistration Procedure

As illustrated in FIG. 18, using such a procedure, the UE may be deregistered from the registered PLMN.

FIG. 18 illustrates a UE-initiated deregistration procedure according to an embodiment of the present invention.

1. The UE may transmit to the AMF a NAS message deregistration request message (abbreviated as 'deregistration request) (including 5G-GUTI, a deregistration type (e.g., switch-off), and an access type). In the present specification, the deregistration type indicates a reason why the UE requests the deregistration and may correspond to the 'switch-off indication' or 'detach reason' described above in Method #1. In addition, the access type may indicate the target access type for which the UE requests the deregistration and correspond to the above-described 'access information' in Method #1 above. The access type indicates whether the deregistration is applied to either '3GPP access' or non-3GPP access' or 'both accesses' (3GPP access and non-3GPP access). The AMF may invoke the deregistration procedure over/for the target access indicated by the UE.

The NAS message (i.e., the deregistration request message) is used to trigger an N2 connection configuration when the UE is in a CM-IDLE state in the 3GPP access and the NAS message is transmitted through the 3GPP access.

2. [Conditional] If the UE does not have a PDU session established through the target access indicated in step 1, steps 2 to 5 are not executed. Conversely, if the UE has the PDU session established via the target access indicated in step 1, steps 2 to 5 are executed.

The AMF may request to the SMF the release of the established PDU session by transmitting an Nsmf_PDUSession_Release SM context message (abbreviated as 'Nsmf_PDUSession_Release SM context') containing a subscriber permanent identifier (SUPI) and/or a PDU session identifier to the SMF. All PDU sessions through the target access belonging to the UE may be released by the AMF that transmits the Nsmf_PDUSession_Release SM context (including a subscriber's permanent ID and/or PDU session ID) message to the SMF for each PDU session.

3. The SMF releases an IP address and/or prefix allocated to the PDU session (indicated) and releases user plane resources corresponding to (the PDU session):

3a. The SMF may transmit an N4 session release request (including the N4 session ID) message to the UPF. The UPF drops any remaining packet of the PDU session and releases all tunnel resources and context associated with the N4 session (identified by the N4 session ID).

3b. The UPF acknowledges the N4 session release request by transmitting an N4 session release response (including the N4 session ID) message to the SMF.

4. The SMF may respond to the Nsmf_PDUSession_Release SM context message with an Nsmf_PDUSession_Release SM context response message.

5. [Conditional] When a dynamic primary component carrier (PCC) is applied to this session (that is, a session to be deleted), the SMF invokes an Npcf_PolicyControl_PolicyDelete service operation to delete the PDU (CAN) session.

6. [Conditional] The AMF invokes the Npcf_AMPolicyControl_Delete service operation to delete association with the PCF if there is any association with the PCF for this UE.

7. [Conditional] The AMF transmits a deregistration accept message (abbreviated as 'deregistration accept') to the UE depending on the deregistration type. That is, when the deregistration type is 'switch-off (of the UE)', the AMF does not transmit the deregistration accept message, otherwise the AMF may transmit the deregistration accept message. The deregistration accept message may include an access type according to the embodiment and the access type indicates an access for which the UE is deregistered.

8. [Conditional] AMF to AN: N2 UE context release request (cause)

When the target access for the deregistration is the 3GPP access or the 3GPP access and the non-3GPP access and there is an N2 signaling connection to an NG-RAN, the AMF transmits an N2 UE release command having a cause configured as the deregistration to the RAN to release the N2 signaling connection. For a detailed description thereof, steps 2 to 4 of 'UE Context release (or NAS signaling connection cancellation procedure) within AN procedure' described in Section 4.2.6 of TS 23.502 v1.2.0 or steps 11 and 12 of Method #1 may be referred.

Steps 2 to 4 of 'UE context release (or NAS signaling connection release procedure) within AN procedure' described in Section 4.2.6 of TS 23.502 v1.2.0 are as follows.

—Section TS 23.502 v1.2.0 4.2.6—

2. AMF to (R)AN: The AMF may receive the N2 UE context release request message or transmit the N2 UE Context Release command (including the cause) to the (R)AN due to an internal AMF event. The cause indicates either a cause for requesting the release or the cause due to the internal AMF event.

3. [Conditional] When the (R)AN connection (e.g., RRC connection or NWu connection) with the UE is not yet released, the (R)AN requests the UE to release the (R)AN connection. Upon receiving a (R)AN release confirmation from the UE, the (R)AN deletes the context of the UE.

4. The (R)AN confirms the N2 release by returning to the AMF an N2 UE context release complete (including a PDU session ID list with an activated N3 user plane) message. A list of PDU session ID(s) indicates the PDU session served by the (R)AN of the UE. The N2 signaling connection between the AMF and the (R)AN for the UE is released. The (R)AN provides the AMF with a list of cell/TA/NG-RAN node identifiers recommended for paging. This step needs to be performed immediately after step 2. That is, for example, when the UE does not acknowledge the RRC connection release, this step should not be delayed.

When the target access for the deregistration is the 3GPP access or the 3GPP access and the non-3GPP access and there is an N2 signaling connection to the N3IWF, the AMF transmits an N2 UE release command having a cause configured as the deregistration to the N3IWF to release the N2 signaling connection. For a detailed description thereof, steps 2 to 5 of 'Deregistration procedure for unreliable non-3GPP access' described in Section 4.12.3 of TS 23.502 v1.2.0 or steps 13 and 14 of Method #1 may be referred.

Steps 2 to 5 in the 'Deregistration procedure for non-3GPP access' described in Section 4.12.3 of TS 23.502 v1.2.0 are as follows.

—Section TS 23.502 v1.2.0 4.2.6—

2. The AMF sends the N2 UE Context Release Command message to the N3IWF.

3. The N3IWF sends an information exchange (payload delete) message to the UE. The payload delete is included to indicate the release of the Internet Key Exchange (IKE) SA.

4. The UE sends an empty INFORMATIONAL EXCHANGE message in order to acknowledge the release of the IKE SA. The IKEv2 tunnel (and the associated IPSec resource) and the local UE context is included in the N3IWF (N3 tunnel Id) to release the non-3GPP access specific resource.

5. The N3IWF acknowledges the N2 UE Context Release Command message by transmitting the N2 UE Context Release Complete message to the AMF.

2) Modified Embodiment of Method #3: Network-Initiated Deregistration Procedure

FIG. 19 illustrates a network-initiated deregistration procedure according to an embodiment of the present invention.

The AMF may initiate the deregistration procedure either explicitly (e.g., operation and maintenance (O&M) intervention) or implicitly (e.g., expiration of an implicit deregistration timer). The UDM may trigger the deregistration procedure for an operator-determined purpose that requests removal of the RM context of the subscriber and the PDU session of the UE.

1. [Conditional] If the UDM intends to request immediate deletion of the RM context and PDU session of the subscriber, the UDM may transmit a Nudm_UE Context Management_RemoveNotification Request (including SUPI and/or removal cause) message in which the subscription withdrawn is configured as the deletion/removal cause to the registered AMF. The Nudm_UE Context Management_RemoveNotification Request may be referred to as a Nudm_UE Context Management_DeregistrationNotification Request.

2. If the AMF receives the Nudm_UE Context Management_RemoveNotification Request message with the removal cause for 'subscription withdrawn' in step 1, the AMF executes the deregistration procedure for all accesses in which the UE is registered.

The AMF-initiated deregistration procedure may be explicit (e.g., by the O&M intervention) or implicit. The AMF does not transmit the deregistration request message to the UE for implicit deregistration. When the UE is in the CM-CONNECTED state, the AMF may explicitly deregister the UE by transmitting the deregistration request (including deregistration type and/or access type) message to the UE. The deregistration type may be configured to re-registration and in this case, the UE needs to be re-registered at the end of the deregistration procedure (e.g., a slice relocation for isolated case). The access type indicates whether the deregistration is applied to either '3GPP access or non-3GPP access' or 'both accesses'. If the 'subscription withdrawn' is indicated from the UDM as the removal cause, the AMF may transmit to the UE the deregistration request message indicating all accesses as the target accesses.

When the deregistration request message is transmitted through the 3GPP access and the UE is in the CM-IDLE state in the 3GPP access, the AMF pages the UE (i.e., transmits the paging (request) message to the UE). This is to continuously perform the deregistration procedure by transitioning the UE from the CM-IDLE state to the CM-CONNECTED state.

3. [Conditional] When the deregistration procedure is triggered by the UDM (step 1), the AMF acknowledges the UDM using an Nudm_UE context Management_RemovalNotification response (including the SUPI and/or access type) message. The Nudm_UE Context Management_RemoveNotification Response may be referred to as a Nudm_UE Context Management_DeregistrationNotification Response.

4. [Conditional] If the UE has any established PDU session for the target access for the deregistration indicated in step 2, steps 2 to 5 of the embodiment of FIG. 18 may be performed.

5. [Conditional] If there is any association with the PCF for this UE, the AMF invokes the Npcf_AMPolicyControl_Delete service operation to release/delete the association with the PCF.

6. [Conditional] When the UE receives the deregistration request message from the AMF in step 2, the UE may transmit the deregistration accept message to the AMF at any time after step 2. In this case, the deregistration accept message may include or not include the access type indicating the deregistered access. The RAN may forward the NAS message to the AMF along with the TAI and the cell identifier of the cell being used by the UE.

7. [Conditional] AMF to AN: N2 UE context release request (cause)

When the target access for the deregistration is the 3GPP access or the 3GPP access and the non-3GPP access and there is an N2 signaling connection to an NG-RAN, the AMF transmits an N2 UE release command having a cause configured as the deregistration to the RAN to release the N2 signaling connection. For a detailed description thereof, steps 2 to 4 of 'UE Context release (or NAS signaling connection cancellation procedure) within AN procedure' described in Section 4.2.6 of TS 23.502 v1.2.0 or steps 11 and 12 of Method #1 described above may be referred.

When the target access for the deregistration is the 3GPP access or the 3GPP access and the non-3GPP access and there is an N2 signaling connection to the N3IWF, the AMF transmits an N2 UE release command having a cause configured as the deregistration to the N3IWF to release the N2 signaling connection. For a detailed description thereof, steps 2 to 5 of 'Deregistration procedure for unreliable non-3GPP access' described in Section 4.12.3 of TS 23.502 v1.2.0 or steps 13 and 14 of Method #1 may be referred.

When Method #2 described above is applied, the section related with the UDM service may be modified/reflected as follows.

5.2.3 UDM service 5.2.3.1 General

Table 2 below shows UDM services (in particular, NF services provided by the UDM).

TABLE 2

| NF service | NF service operations | Operation schematics | Known Consumer(s) | Ref. |
|---|---|---|---|---|
| Subscriber Data Management | Get | Request/Response | AMF, SMF, SMSF | Many call flows in clause 4 e.g. 4.5.2, 4.5.1 |
|  | UpdateNotification | Subscribe/Notify | AMF, SMF, SMSF |  |
| UE context management | Registration | Request/Response | AMF, SMF, SMSF | Many call flows in clause 4, 4.5.2, 4.2.5.2 |
|  | RemoveNotification | Request/Response | AMF, SMF, SMSF |  |
|  | Deregistration | Request/Response | AMF, SMF, SMSF |  |
|  | Get | Request/Response | NEF |  |
|  | Update | Request/Response | AMF |  |
| UE Authentication | Request | Request/Response | AUSF |  |
| EventExposure | Subscription request/response Notification | Subscribe/Notify Request/Response | NEF | Clause 5.4.2 |

5.2.3.2.2 Nudm_UE Context Management_Removal Notification (or Nudm_UE Context Management_Deregistration Notification)

Name of service operation: Nudm_UE Context Management_Removal Notification

Description: The UDM notifies the previously registered NF consumers that the NF ID is deregistered in the UDM (using the Nudm_UE Context Management_Registration operation). As a result, the consumer is no longer registered in the UDM as a serving NF for the corresponding UE. This requires the deregistration because the consumer is no longer the serving NF for the corresponding UE.

Known NF consumers: AMF, SMF, SMSF

Input, required: SUPI, serving NF removal cause

Input, optional: None

Output, required: None

Output, optional: None

For an example of the use of the service operation, step 14c of Section 4.2.2.2.2 may be referred. The serving NF removal cause may inform the consumer NF of the cause for transmitting the removal notification. The cause may be any one of the following:

UE-initiated registration

UE registration area change

Subscription withdrawn

FIG. 20 illustrates a UE-initiated deregistration procedure according to an embodiment of the present invention. The embodiments of FIGS. 17 and 18 described above in connection with Method #1 above may be applied to the flowchart in the same or similar manner and the duplicated description will be omitted below.

First, the AMF may receive the deregistration request message for requesting the deregistration from the UE (S2010). In this case, the deregistration request message to be transmitted may include deregistration type information and first access type information indicating the target access to which the deregistration is to be applied. Herein, the first access type information may indicate whether the target access is the first or second access, or the first and second accesses. The first access may be the 3GPP access and the second access may be the non-3GPP access.

Next, if the UE has the PDU session established through the target access, the AMF may request the SMF to release the established PDU session (S2020). To this end, the AMF may transmit a first message (e.g., a detach indication message or Nsmf_PDUSession_Release SM Context message) for requesting the release of the established PDU session to the SMF. In this case, the first message may include a subscriber permanent identifier (SUPI) corresponding to the UE and an identifier of a PDU session to be released. When the SMF receives the first message, the SMF may release an Internet protocol (IP) address and/or prefix allocated to the PDU session to be released and release user plane resources corresponding to the PDU session to be released. In addition, the SMF may transmit an N4 session release request message for the release of the N4 session to the UPF and when the UPF receives the N4 session release request message, the UPF may release all tunnel resources and contexts associated with the N4 session.

Next, the AMF may transmit the deregistration accept message to the UE depending on the deregistration type (S2030). The deregistration type information may indicate whether the deregistration request is due to the switch-off of the UE. When the deregistration type information indicates that the deregistration request is due to the switch-off of the UE, the deregistration accept message may not be transmitted and when the deregistration type information does not indicate that the deregistration request is due to the switch-off of the UE, the deregistration accept message may be transmitted. The deregistration accept message may include second access type information indicating the access for which the UE is deregistered.

When the target access is 'the 3GPP access' or 'the 3GPP access and the non-3GPP access' and there is the N2 signaling connection between the UE and the (R)AN, the AMF may transmit to the (R)AN an N2 UE release command in which the deregistration is configured as the cause in order to release the N2 signaling connection. Alternatively, when the target access is 'the non-3GPP access' or 'the 3GPP access and the non-3GPP access' and there is the N2 signaling connection between the UE and the N3IWF, the AMF may transmit to the N3IWF the N2 UE release command in which the deregistration is configured as the cause in order to release the N2 signaling connection.

Meanwhile, when there is the PCF associated with the UE, the AMF may invoke an operation (e.g., the Npcf_AMPolicyControl_Delete service operation) for deleting the association between the UE and the PCF.

FIG. 21 is a flowchart illustrating a network-initiated deregistration procedure according to an embodiment of the present invention. The embodiment of FIG. 19 described above in connection with Method #3 above may be applied to the flowchart in the same or similar manner and the duplicated description will be omitted below.

First, the AMF may receive a first message (e.g., a location cancellation request or a Nudm_UE Context Management_Removal Notification Request) with the removal cause configured to the subscription withdrawn from the UDM (S2110). As such, the deregistration procedure for the access in which the UE is registered may be triggered by the first message transmitted by the UDM. Further, according to the embodiment, the first message may further include the subscriber permanent identifier (SUPI) of the UE.

Next, the AMF may transmit to the UE the deregistration request message for requesting the deregistration (S2120). The deregistration may be performed for all accesses in which the UE is registered when the removal cause received from the UDM through the first message indicates the subscription withdrawn of the UE. The deregistration request message may include access type information indicating the target access to which the deregistration is to be applied. The access type information may indicate whether the target access is the first or second access, or the first and second accesses. Herein, the first access may be the 3GPP access and the second access may be the non-3GPP access.

When the deregistration request message is transmitted through the 3GPP access and the UE is in the CM-IDLE state in the 3GPP access, the AMF may page the UE. Alternatively, when the target access is 'the 3GPP access' or 'the 3GPP access and the non-3GPP access' and there is the N2 signaling connection between the UE and the (R)AN, the AMF may transmit to the (R)AN the N2 UE release command in which the deregistration is configured as the cause in order to release the N2 signaling connection. Alternatively, when the target access is 'the non-3GPP access' or 'the 3GPP access and the non-3GPP access' and there is the N2 signaling connection between the UE and the N3IWF, the AMF may transmit to the N3IWF the N2 UE release command in which the deregistration is configured as the cause in order to release the N2 signaling connection.

Further, although not shown in the flowchart, the AMF may transmit a first deregistration response message to the UDM in response to the first message and in this case, the first deregistration response message may include the SUPI and the access type information.

If the UE has the PDU session established through the target access, the AMF may request the SMF to release the established PDU session. To this end, the AMF may transmit the second message for requesting the release of the established PDU session to the SMF. In this case, the second message may include the SUPI and the identifier of the PDU session to be released. In this case, the SMF receives the second message may release the IP address and/or prefix allocated to the PDU session to be released and release the user plane resources corresponding to the PDU session to be released. In addition, the SMF may transmit the N4 session release request message for the release of the N4 session to the UPF and the UPF that receives the N4 session release request message may release all tunnel resources and contexts associated with the N4 session.

General Apparatus to which the Present Invention May be Applied

FIG. 22 shows a block diagram of a communication apparatus according to an embodiment of the present invention.

Referring to FIG. 22, a wireless communication system includes a network node 2210 and a plurality of UEs 2220. The apparatus shown in this drawing may be implemented to perform at least one of the aforementioned network/UE functions and may be implemented to integrate and perform one or more of the functions.

The network node 2210 includes a processor 2211, memory 2212, and a communication module 2213.

The processor 2211 implements at least one function, process and/or method proposed above and/or the function, process and/or method proposed in this document. Furthermore, a module, program, etc. that implements the function, process and/or method proposed in this specification may be stored in the memory 2212 and executed by the processor 2211.

The layers of a wired/wireless interface protocol may be implemented by the processor 2211. Furthermore, the processor 2211 may be implemented to independently apply the contents described in the various embodiments proposed in this document or to apply two or more of the embodiments at the same time.

The memory 2212 is connected to the processor 2211 and stores various types of information for driving the processor 2211. The memory 2212 may be located inside or outside the processor 2211 and may be connected to the processor 2211 by well-known various means.

The communication module 2213 is connected to the processor 2211 and transmits and/or receives wired/wireless signals. The network node 2210 may include, for example, an eNB, an MME, an HSS, an SGW, a PGW, an SCEF, an SCS/AS, an AUSF, an AMF, a PCF, an SMF, a UDM, a UPF, an AF, an (R)AN, a UE, an NEF, an NRF, a UDSF and/or an SDSF. Specifically, if the network node 2210 is an eNB (or if it is implemented to perform an (R)AN function), the communication module 2213 may include a radio frequency (RF) unit for transmitting/receiving radio signals. In this case, the network node 2210 may have a single antenna or multiple antennas.

The UE 2220 includes a processor 2221, memory 2222 and a communication module (or RF unit) 2223. The processor 2221 implements at least one function, process and/or method proposed above and/or the function, process and/or method proposed in this document. Furthermore, a module, program, etc. that implements the function, process and/or method proposed in this specification may be stored in the memory and executed by the processor 2221.

The layers of a wired/wireless interface protocol may be implemented by the processor 2221. Furthermore, the processor 2221 may be implemented to independently apply the contents described in the various embodiments proposed in this document or to apply two or more of the embodiments at the same time.

The memory 2222 is connected to the processor 2221 and stores various types of information for driving the processor 2221. The memory 2222 may be located inside or outside the processor 2221 and may be connected to the processor 2221 by well-known various means The memory 2212, 2222 may be located inside or outside the processor 2211, 2221 and may be connected to the processor 2211, 2221 by well-known various means. Furthermore, the network node 2210 (if it is an eNB) and/or the UE 2220 may have a single antenna or multiple antennas.

FIG. 22 shows a block diagram of a communication apparatus according to an embodiment of the present invention.

Specifically, FIG. 23 is a more detailed diagram of the UE of FIG. 22.

Referring to FIG. 23, the UE may include a processor (or digital signal processor (DSP)) 2310, an RF module (or RF unit) 2335, a power management module 2305, an antenna 2340, a battery 2355, a display 2315, a keypad 2320, memory 2330, a subscriber identification module (SIM) card 2325 (this element is optional), a speaker 2345 and a microphone 2350. The UE may also include a single antenna or multiple antennas.

The processor 2310 implements the functions, processes and/or methods proposed above. The layers of a radio interface protocol may be implemented by the processor 2310.

The memory 2330 is connected to the processor 2310 and stores information related to the operation of the processor 2310. The memory 2330 may be located inside or outside the processor 2310 and may be connected to the processor 2310 by well-known various means.

A user inputs command information, such as a telephone number, by pressing (or touching) a button of the keypad 2320 or by voice activation using the microphone 2350, for example. The processor 2310 processes a proper function, such as receiving such command information or making a call to a telephone number, so that the function is performed. Operational data may be extracted from the SIM card 2325 or the memory 2330. Furthermore, the processor 2310 may display command information or driving information on the display 2315 so that a user can recognize the information or for convenience.

The RF module 2335 is connected to the processor 2310 and transmits and/or receives RF signals. The processor 2310 transfers command information to the RF module 2335 so that a radio signal forming voice communication data, for example, is transmitted in order to initiate communication. The RF module 2335 includes a receiver and a transmitter in order to transmit and receive radio signals. The antenna 2340 functions to transmit and receive radio signals. When the RF module 2335 receives a radio signal, it transfers the signal for the processing of the processor 2310 and may convert the signal into a baseband. The processed signal may be converted into audible or readable information through the speaker 2345.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. Order of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

In this specification, 'A and/or B' can be interpreted to mean 'at least one of A and (or) B.'

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The present invention has been described based on an example in which it has been applied to the 3GPP LTE/LTE-A/5G (NextGen) systems, but may be applied to various wireless communication systems in addition to the 3GPP LTE/LTE-A/5G (NextGen) systems.

What is claimed is:

1. A method of performing, by an access and mobility management function (AMF), an AMF-initiated deregistration procedure in a wireless communication system, the method comprising:
receiving, from a unified data management (UDM), a first message for requesting a removal of a subscriber's registration management (RM) context and at least one protocol data unit (PDU) session of a user equipment (UE),
wherein the first message includes a reason of the removal, and an access type informing a target access for the AMF-initiated deregistration procedure;
performing the AMF-initiated deregistration procedure for both a 3rd generation partnership project (3GPP) access and a non-3GPP access upon receiving the first message in which (i) the reason of the removal is set to a subscription withdrawn of the UE, and (ii) the access type informs both the 3GPP access and the non-3GPP access as the target access; and
transmitting, to the UE, a second message for requesting the AMF-initiated deregistration procedure, the second message including the access type informing both the 3GPP access and the non-3GPP access as the target access.

2. The method of claim 1, further comprising:
transmitting, to a radio access network (RAN), a third message for releasing an N2 signaling connection, the third message including information for a cause set to the deregistration,
wherein the third message is transmitted, based on that (i) the AMF-initiated deregistration procedure is performed over the 3GPP access and (ii) there is the N2 signaling connection between the UE and the RAN.

3. The method of claim 1,
wherein, the AMF-initiated deregistration procedure is either explicit or implicit, and
wherein based on the AMF-initiated deregistration procedure being explicit, the AMF-initiated deregistration procedure is performed by an orientation and mobility (O&M) intervention.

4. The method of claim 1, further comprising:
paging the UE based on the second message being transmitted through the 3GPP access and the UE being in a connection management (CM)-IDLE state in the 3GPP access.

5. The method of claim 1, wherein the first message further includes a subscriber permanent identifier (SUPI) of the UE.

6. The method of claim 1, further comprising:
transmitting, to the UDM, a first deregistration response message in response to the first message.

7. The method of claim 6, further comprising:
requesting a session management function (SMF) to release an established PDU session.

8. The method of claim 7, wherein the requesting of the release of the established PDU session includes transmitting a fourth message for requesting the release of the established PDU session to the SMF.

9. The method of claim 8, wherein the fourth message includes the SUPI and an identifier of the PDU session to be released.

10. The method of claim 7, wherein the SMF is a network entity that releases an internet protocol (IP) address or prefix allocated to the PDU session to be released and releases user plane resources corresponding to the PDU session to be released.

11. The method of claim 7, wherein:
the SMF is a network entity that transmits an N4 session release request message for requesting the release of an N4 session to a user plane function (UPF), and
the UPF is a network entity that releases all tunnel resources and contexts associated with the N4 session.

12. An access and mobility management function (AMF) performing an AMF-initiated deregistration procedure in a wireless communication system, the AMF comprising:
a transceiver;
at least one processor; and
at least one computer memory operably connectable to the at least one processor and storing instructions that, when executed by the at least one processor, perform operations comprising:
receiving, from a unified data management (UDM), a first message for requesting a removal of a subscriber's registration management (RM) context and at least one protocol data unit (PDU) session of a user equipment (UE),
wherein the first message includes a reason of the removal, and an access type informing a target access for the AMF-initiated deregistration procedure;
performing the AMF-initiated deregistration procedure for both a 3rd generation partnership project (3GPP) access and a non-3GPP access upon receiving the first message in which (i) the reason of the removal is set to a subscription withdrawn of the UE, and (ii) the access type informs both the 3GPP access and the non-3GPP access as the target access; and
transmitting, to the UE, a second message for requesting the AMF-initiated deregistration procedure, the second message including the access type informing both the 3GPP access and the non-3GPP access as the target access.

13. The AMF of claim 12, wherein the operations further comprise:
transmitting, to a radio access network (RAN), a third message for releasing an N2 signaling connection, the third message including information for cause set to the deregistration,
wherein the third message is transmitted, based on that (i) the AMF-initiated deregistration procedure is performed over the 3GPP access and (ii) there is the N2 signaling connection between the UE and the RAN.

14. The AMF of claim 12,
wherein, the AMF-initiated deregistration procedure is either explicit or implicit, and
wherein based on the AMF-initiated deregistration procedure being explicit, the AMF-initiated deregistration procedure is performed by an orientation and mobility (O&M) intervention.

15. The AMF of claim 12, wherein the operations further comprise:
paging the UE based on the second message being transmitted through the 3GPP access and the UE being in a connection management (CM)-IDLE state in the 3GPP access.

16. The AMF of claim 12, wherein the first message further includes a subscriber permanent identifier (SUPI) of the UE.

* * * * *